(12) United States Patent
Hashimoto

(10) Patent No.: US 6,351,560 B1
(45) Date of Patent: Feb. 26, 2002

(54) APPARATUS, METHOD, AND PROGRAM FOR LOCATING AN OBJECTIVE ON A FORM AND A RECORDING MEDIUM FOR RECORDING THE PROGRAM FOR LOCATING THE OBJECTIVE ON THE FORM

(75) Inventor: Koji Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/006,200

(22) Filed: Jan. 13, 1998

(30) Foreign Application Priority Data

Jun. 10, 1997 (JP) .............................. 9-152557

(51) Int. Cl.⁷ ................................. G06K 9/00
(52) U.S. Cl. ...................... 382/181; 382/173; 382/176; 382/190; 382/266; 382/290; 382/291; 382/321; 358/453; 707/500; 707/521
(58) Field of Search ................................ 382/170, 173, 382/174, 176, 199, 190, 195, 203, 256, 266, 321, 289, 290, 298, 296, 317, 175, 305, 306, 309, 310, 291; 358/456, 453; 707/500, 521

(56) References Cited

U.S. PATENT DOCUMENTS

| 4,533,959 A | * | 8/1985 | Sakurai ........................ 382/61 |
| 4,558,461 A | * | 12/1985 | Schlang ....................... 382/290 |
| 4,589,144 A | * | 5/1986 | Namba ........................ 382/175 |
| 4,799,271 A | * | 1/1989 | Nagasawa et al. .......... 382/231 |
| 4,878,124 A | * | 10/1989 | Tsujimoto et al. ........... 358/443 |
| 4,926,490 A | * | 5/1990 | Mano ............................. 382/9 |
| 4,985,930 A | * | 1/1991 | Takeda et al. ............... 382/306 |
| 5,101,448 A | * | 3/1992 | Kawachiya et al. ........... 382/61 |
| 5,119,433 A | * | 6/1992 | Will ............................ 382/175 |
| 5,140,650 A | * | 8/1992 | Casey et al. ................. 382/176 |
| 5,182,656 A | * | 1/1993 | Chevion et al. ............. 358/450 |
| 5,506,918 A | * | 4/1996 | Ishitani ......................... 382/46 |
| 5,535,119 A | * | 7/1996 | Ito et al. ......................... 707/3 |
| 5,617,481 A | * | 4/1997 | Nakamura ................... 382/101 |
| 5,852,676 A | * | 12/1998 | Lazar .......................... 382/173 |
| 5,966,138 A | * | 10/1999 | Tanaka ........................ 345/437 |

FOREIGN PATENT DOCUMENTS

JP         7-044682         2/1995

\* cited by examiner

Primary Examiner—Leo Boudreau
Assistant Examiner—Sheela Chawan
(74) Attorney, Agent, or Firm—Staas & Halsey LLP

(57) ABSTRACT

An apparatus, a method, and a program locate an objective on a form without a black background function or specific marks irrespective of whether or not there are ruled lines on the form.

The apparatus, method, and program select a predetermined number of small reference areas in an image of a learning sheet, store data about the small reference areas in a memory, retrieve equivalent small areas corresponding to the small reference areas from an image of an input sheet, and locate a position in the image of the input sheet corresponding to a given position on the learning sheet, according to relationships between the small reference areas and the equivalent small areas. The program is stored in a recording medium that is readable by computer.

39 Claims, 23 Drawing Sheets

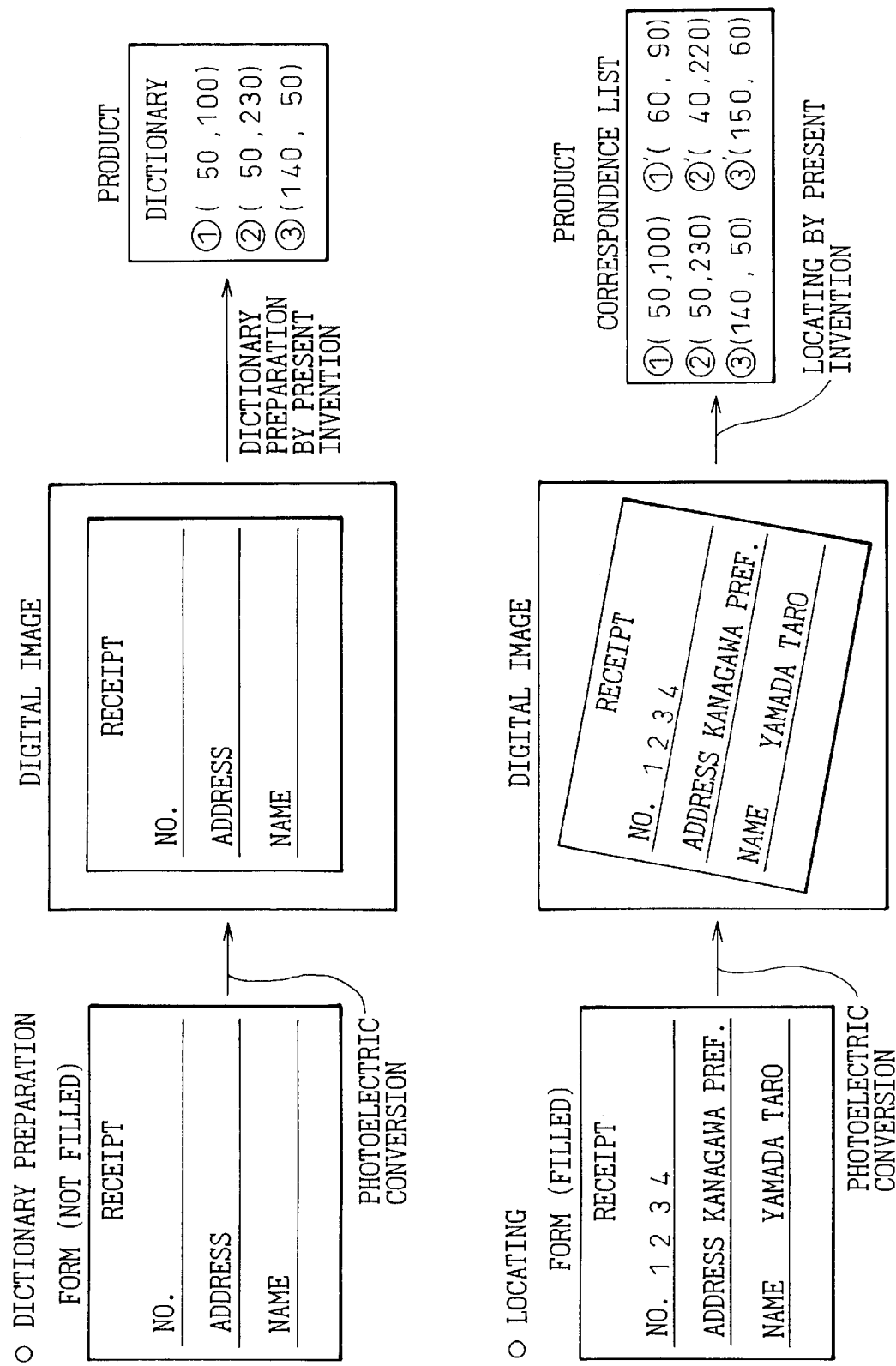

Fig.1B
○ POSITIONAL ESTIMATION BASED ON CORRESPONDENCE LIST
LEARNING IMAGE (NOT FILLED)　　　　INPUT IMAGE (FILLED)
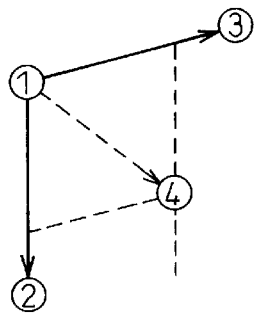
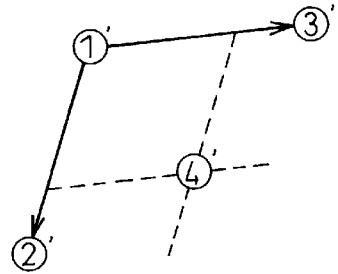

| 氏名 | 出欠 | リクエスト |
|---|---|---|
|  |  |  |
|  |  |  |
|  |  |  |
|  |  |  |

Fig. 8
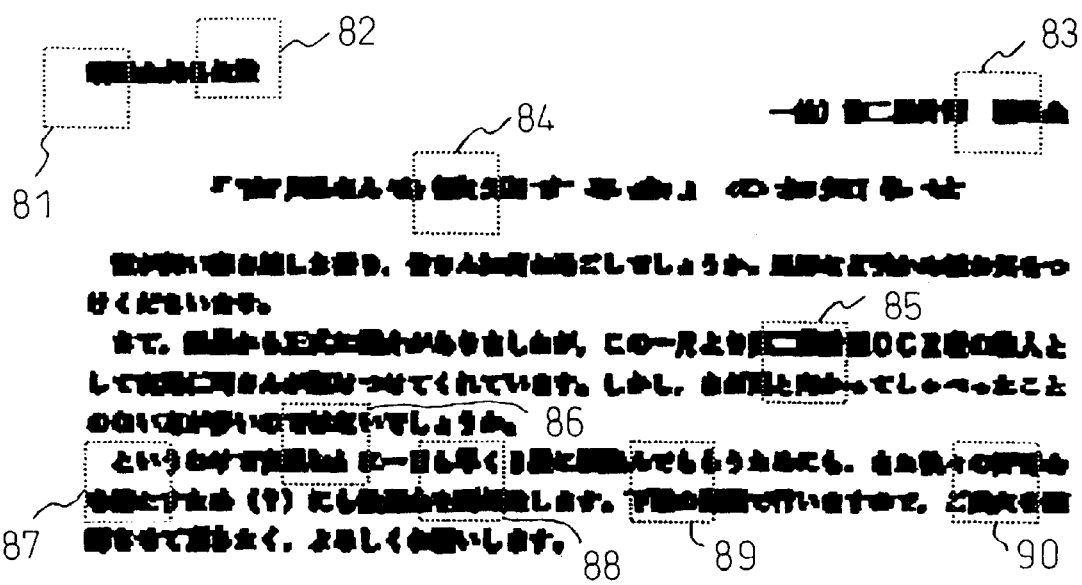
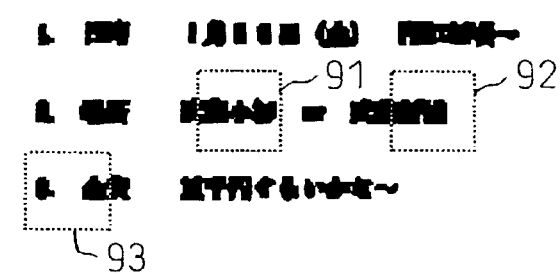
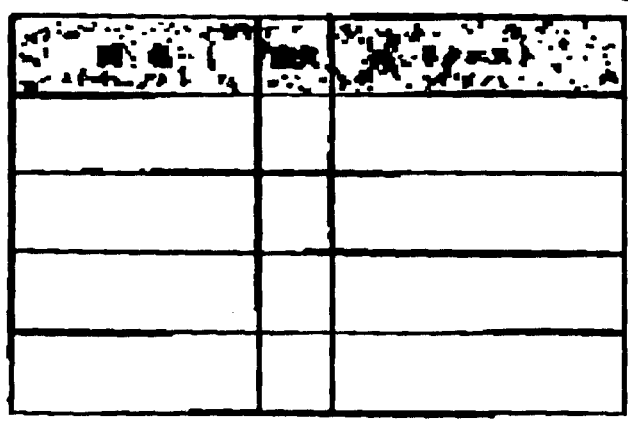

| 氏名 | 出欠 | リクエスト |
|---|---|---|
| 天明 | 出 | |
| 岩渕 | 出 | |
| 津留 | 欠 | |
| | | |

Fig.11

| | | | | |
|---|---|---|---|---|
| 1 | (14) | | | |
| 2 | 640 | 788 | 600 | 800 |
| 3 | 840 | 844 | 800 | 852 |
| 4 | 1348 | 660 | 1304 | 660 |
| 5 | 352 | 848 | 312 | 868 |
| 6 | 1628 | 840 | 1588 | 836 |
| 7 | 1348 | 1632 | 1324 | 1632 |
| 8 | 992 | 1296 | 960 | 1304 |
| 9 | 832 | 400 | 784 | 408 |
| 10 | 1280 | 1296 | 1248 | 1300 |
| 11 | 1632 | 272 | 1584 | 268 |
| 12 | 512 | 192 | 460 | 208 |
| 13 | 288 | 240 | 236 | 260 |
| 14 | 1152 | 844 | 1112 | 848 |
| 15 | 740 | 1424 | 712 | 1436 |

| B | B | B | B | B |
|---|---|---|---|---|
| B | A1 | A2 | A3 | B |
| B | A4 | A5 | A6 | B |
| B | A7 | A8 | A9 | B |
| B | B | B | B | B |

Fig.23
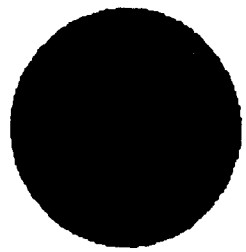
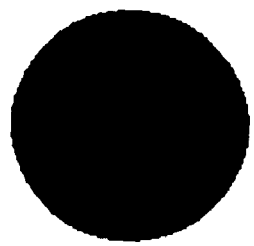
Fig.24

APPARATUS, METHOD, AND PROGRAM FOR LOCATING AN OBJECTIVE ON A FORM AND A RECORDING MEDIUM FOR RECORDING THE PROGRAM FOR LOCATING THE OBJECTIVE ON THE FORM

BACKGROUND OF THE INVENTION

1. Field of the Invention

The present invention relates to a technique for locating an objective on a form. In particular, the present invention relates to an apparatus for, a method for, and a program for locating an objective on a form, as well as a recording medium that stores the program and is readable by computer. The form includes fixed information and an area for receiving additional information. The apparatus, method, program, and recording medium are used to locate an objective area, such as the additional information area on the form either when digitizing the form and converting the information on the form into character codes using an image scanner and an optical character reader (OCR), or when printing new data in the additional information area.

For example, a meeting attendance form contains fixed information and information to be added later. Copies of the form are delivered to expected attendants, who fill the copies with required information. The copies are collected, and the information added thereto is read by, for example, an OCR. The collected copies may be extended or contracted due to heat, or may be skewed in an automatic document feeder (ADF) of an image scanner. Even if a copy is correctly set at a sheet reading position of the image scanner, it may deviate from the position when a lid is put on the scanner. Thus, the copies frequently move out of position on the scanner. In this case, the OCR is unable to correctly recognize an area on the form where the additional information is present, and therefore, does not read the additional information. Accordingly, it is necessary to provide the OCR with a technique of locating a target area in a scanned image.

2. Description of the Related Art

There are basically three conventional locating methods.

FIG. 28 shows the first of the conventional methods. This method employs a black background when converting a form into a digital image by an image scanner. The method detects edges of the form and estimates the contraction, extension, and skew of the form according to top-to-bottom distances, side-to-side distances, and edge slants. Thereafter, the method locates an additional information area based on distances from the edges.

The second of the conventional methods prints specific marks on a form. The method detects the marks in an image of the form read by OCR. Based on the read marks, the method estimates the contraction, extension, and skew of the form and locates an additional information area in the read image.

The third of the conventional methods extracts easily extractable information such as ruled lines out of an image of a form and relates the extracted information to an additional information area, thereby locating the additional information area.

The first conventional method has a problem in that OCRs having the black background function are expensive and rare. In addition if a form is copied obliquely so that an additional information area on the form shifts from the edges of the copy, the method is unable to locate the additional information area on the copy.

The second conventional method has a problem in that specific marks must be printed on a form, requiring additional labor and cost.

The third conventional method has a problem in that it stably extracts only ruled lines from a form at the present level of the technology, and therefore, is unable to cope with forms having no ruled lines.

SUMMARY OF THE INVENTION

An object of the present invention is to provide a locating apparatus, a locating method, and a locating program that combine the second and third conventional methods without involving any of the problems thereof. The present invention partly uses patterns on a form as marks and correctly locates a target part on the form by an OCR that is not provided with the black background function. The present invention needs no specific marks printed on the form and locates the target part on the form irrespective of whether or not the form contains ruled lines. The present invention also provides a recording medium that stores the locating program and is readable by computer.

In order to accomplish the objects, the present invention provides a locating apparatus, a locating method, and a locating program that read an image of a learning form containing fixed information, selecting a predetermined number of small reference areas in the learning-form image, storing data about the small reference areas in a memory, reading an image of an input form that contains the same information as the learning form, collating the input-form image with the small reference area data stored in the memory, retrieving equivalent small areas that contain the same data as the small reference areas from the input-form image, and, according to the relationships between the equivalent and small reference areas, locating a part in the input-form image that corresponds to a given part on the learning form. The present invention also provides a recording medium that stores the locating program and is readable by computer.

The present invention may use a photoelectric converter to prepare the learning-form image. Then, the present invention extracts an edge image from the learning-form image and selects optimum small reference areas from the edge image.

In this way, the present invention uses parts of a learning form as reference marks and locates a target part on an input form by OCR that is not provided with the black background function. The present invention needs no specific marks printed on the input form and locates the target part on the input form irrespective of whether or not the input form contains ruled lines.

BRIEF DESCRIPTION OF THE DRAWINGS

These and other objects and advantages of the present invention will become more apparent and more readily appreciated from the following description of the preferred embodiments, taken in conjunction with the accompanying drawings, in which:

FIGS. 1A and 1B roughly explain a locating technique according to the present invention;

FIG. 7 shows an example of an image of a learning form;

FIG. 8 shows a coarse image based on the image of FIG. 7;

FIG. 9 shows an example of an image of an input form;

FIG. 11 is a list showing correspondence between small reference areas on the learning form and equivalent small areas on the input form;

FIG. 23 shows a pattern that is not easily skewed;

FIG. 24 shows a pattern that is vulnerable to skew;

DESCRIPTION OF THE PREFERRED EMBODIMENTS

Figure 2:
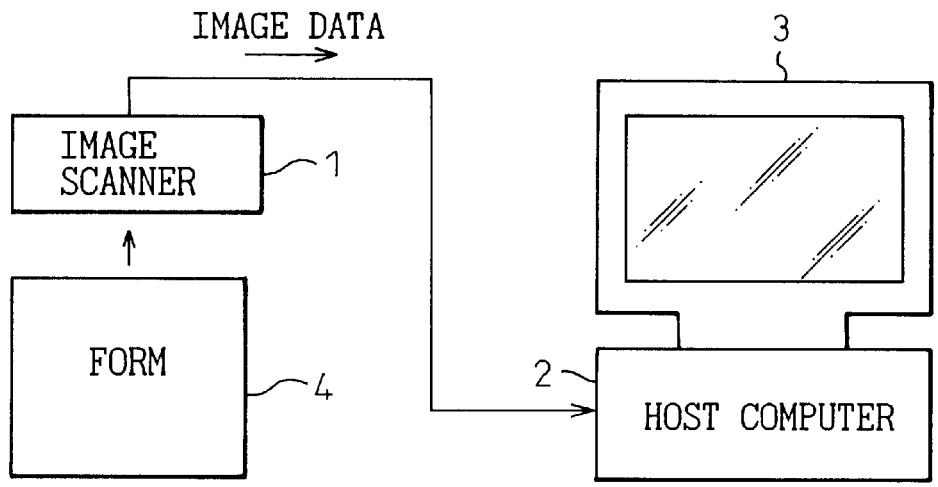
FIG. 2 shows a locating system according to the present invention.

FIG. 1A roughly explains a locating technique according to the present invention. The upper part of FIG. 1A shows a dictionary forming stage. In this stage, a photoelectric converter reads a learning form that contains fixed information and is not filled with additional information, and prepares a digital image. A predetermined number of small reference areas are selected from the digital image and are stored in a dictionary memory.

The lower part of FIG. 1A shows a locating stage. In the locating stage, the photoelectric converter reads an input form, which contains the same information as the learning form as well as additional information filled in specific areas, and prepares a digital image. Equivalent small areas corresponding to the small reference areas are retrieved from the input-form digital image, and a correspondence list is prepared to show relationships between the positions of the equivalent and small reference areas.

FIG. 1B explains a technique of using the correspondence list to locate a position in the input-form image corresponding to an optional position in the learning-form image. The correspondence list shown in the lower part of FIG. 1A contains, for example, positions (1) (50, 100), (2) (50, 230), and (3) (140, 50) found in the learning-form image and corresponding positions (1)' (60, 90), (2)' (40, 220), and (3)' (150, 60) found in the input-form image. These positions are depicted in upper part of FIG. 1B. In lower part of FIG. 1B, an optional position (4) in the learning-form image is expressed with a sum of a multiplication of a vector of (1)→(2) by a constant and a multiplication of a vector of (1)→(3) by a constant. These constants are applied to vectors (1)'→(2)' and (1)'→(3)' in the input-form image, to locate a position (4)' corresponding to the position (4). In this way, it is possible to locate and read a target part on a given form. For example, it is possible to locate an additional information area on a form and read handwritten characters therefrom.

FIG. 2 shows a locating system according to the present invention. The system has an image scanner 1, a host computer 2 having OCR software, a display 3, and a form 4.

The image scanner 1 converts information on the form 4 into a digital image, which is transferred to the host computer 2. The host computer 2 converts the digital image into character codes. Then, the OCR software of the present invention locates the part where the characters are present in the image as mentioned above and as will be explained below in detail. Even if the form 4 is slanted with respect to the image scanner 1, or is contracted or extended, the OCR software correctly locates the character written area on the form 4 and correctly recognizes handwritten characters.

Figure 3:
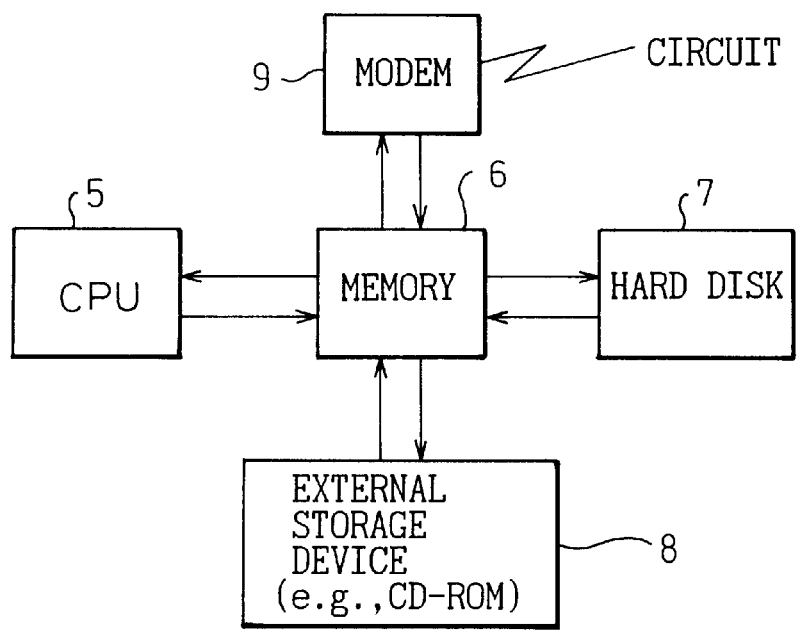
FIG. 3 is a block diagram showing an example of a host computer 2 of the system of FIG. 2.

FIG. 3 is a block diagram showing an example of the host computer 2. The host computer 2 has a CPU 5, a memory 6, a hard disk 7, and an external storage device 8 such as a CD-ROM. The OCR software of the present invention may be stored in the external storage device 8 and be loaded to the memory 6 as required. Alternatively, the OCR software may be loaded to the memory 6 of a remote database through a circuit and a modem 9.

Figure 4:
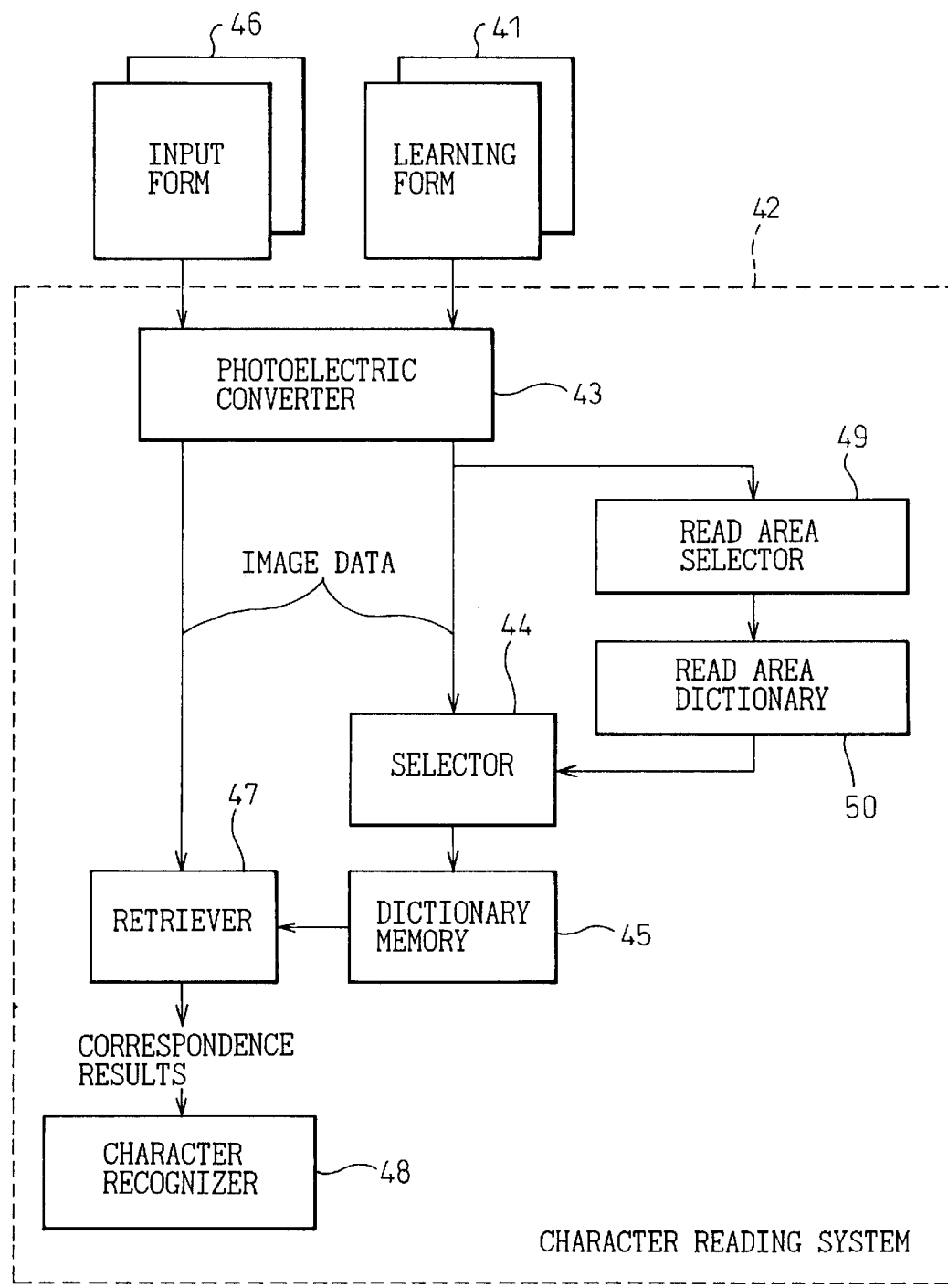
FIG. 4 is a block diagram showing a locating apparatus according to the present invention.

FIG. 4 is a functional block diagram showing a locating apparatus according to the present invention. This apparatus is realized in the system of FIG. 2. In FIG. 4, a learning form 41 includes fixed information and an additional information area. A character reader system 42 includes the image scanner 1 and host computer 2 of FIG. 1. Components arranged in the system 42 will be explained. A photoelectric converter 43 optically reads information on the learning form 41 and an input form 46 and provides digital images thereof. The input form 46 contains the fixed information of the learning form 41 as well as additional information. A selector 44 selects a predetermined number of small reference areas in the digital image of the learning form 41. A dictionary memory 45 stores data about the small reference areas. A retriever 47 collates the small reference areas with the image of the input form 46 and retrieves equivalent small areas corresponding to the small reference areas from the input-form image. A character recognizer 48 (i.e. a locator) identifies the additional information according to the relationships between the equivalent and small reference areas and recognizes characters from the additional information.

A read area selector 49 selects a read area such as a handwriting area from the learning-form digital image provided by the photoelectric converter 43. A read area dictionary 50 stores the coordinates of the read area. The selector 44 selects the small reference areas in consideration of the read area.

Figure 5:
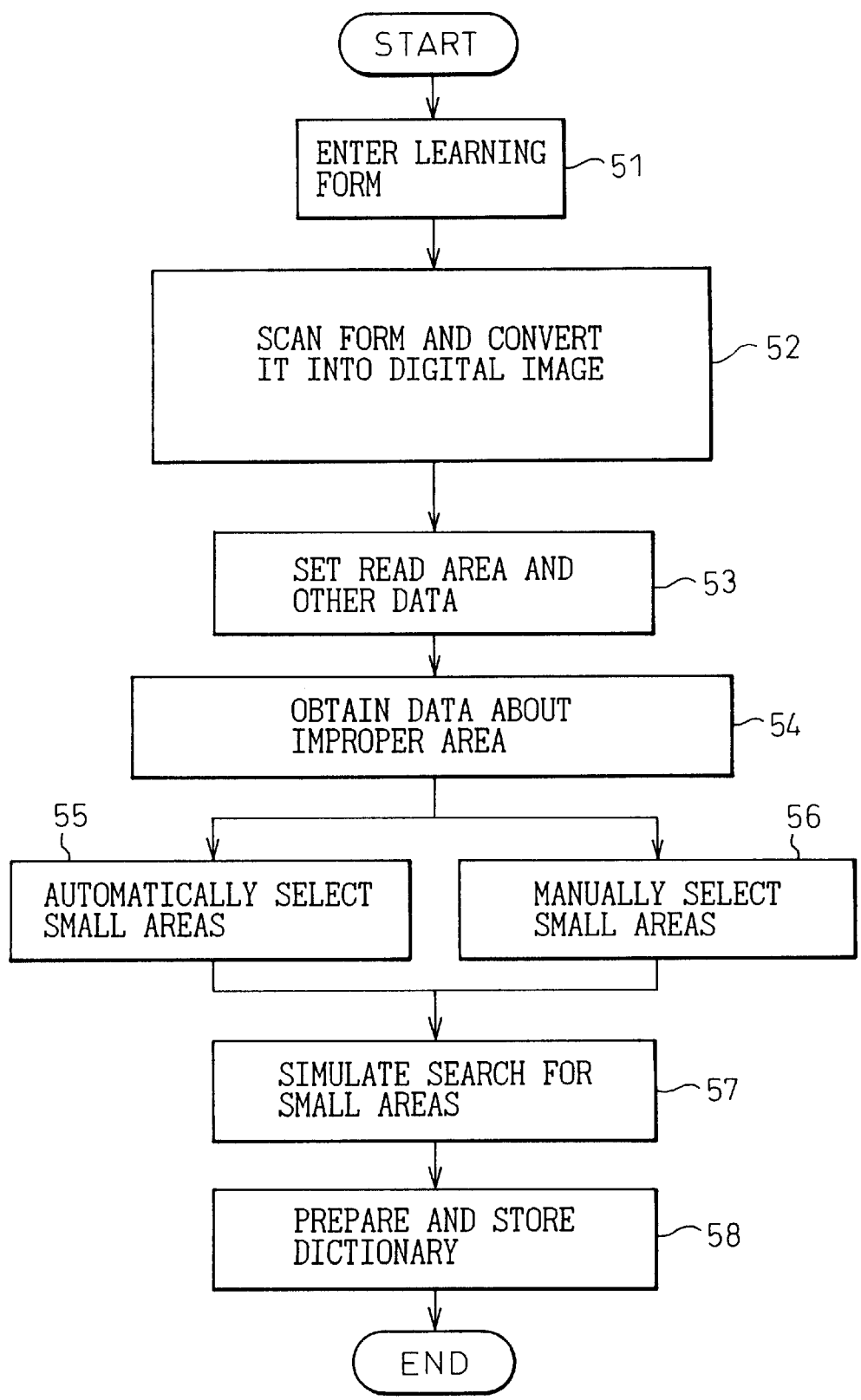
FIG. 5 is a flowchart showing a method of forming a dictionary memory of the apparatus of FIG. 4.

FIG. 5 is a flowchart showing a method of creating data to be stored in the dictionary memory 45 with the use of the apparatus of FIG. 4. In step 51, the image scanner 1 (FIG. 2) reads the learning form 41. In step 52, the image scanner 1 photoelectrically forms a digital image of the learning form 41. In step 53, the read area selector 49 sets positional information about a read area in the learning-form image, and the read area dictionary 50 stores the information. The read area is, for example, an area to be filled with handwritten information. Step 54 obtains information about improper areas that are improper or unsuitable to use as small reference areas. The improper areas include, for example, crosshatched areas and the read area mentioned above. The improper areas will be explained later in detail. Step 55 automatically selects candidates for small reference areas. Alternatively, step 56 manually selects candidates for small reference areas. Step 57 determines whether or not the candidate small areas withstand skew, contraction, and extension to be applied to the form. This is done through simulations to be explained later in detail. The simulations deform the learning-form image and retrieve equivalent small areas corresponding to the candidate small areas from the deformed image. Improper ones of the candidate small areas are abandoned, and only the small areas remain. Step 58 stores the positions and inside patterns of the remaining optimum small areas serving as the small reference areas in the dictionary memory 45.

Figure 6:
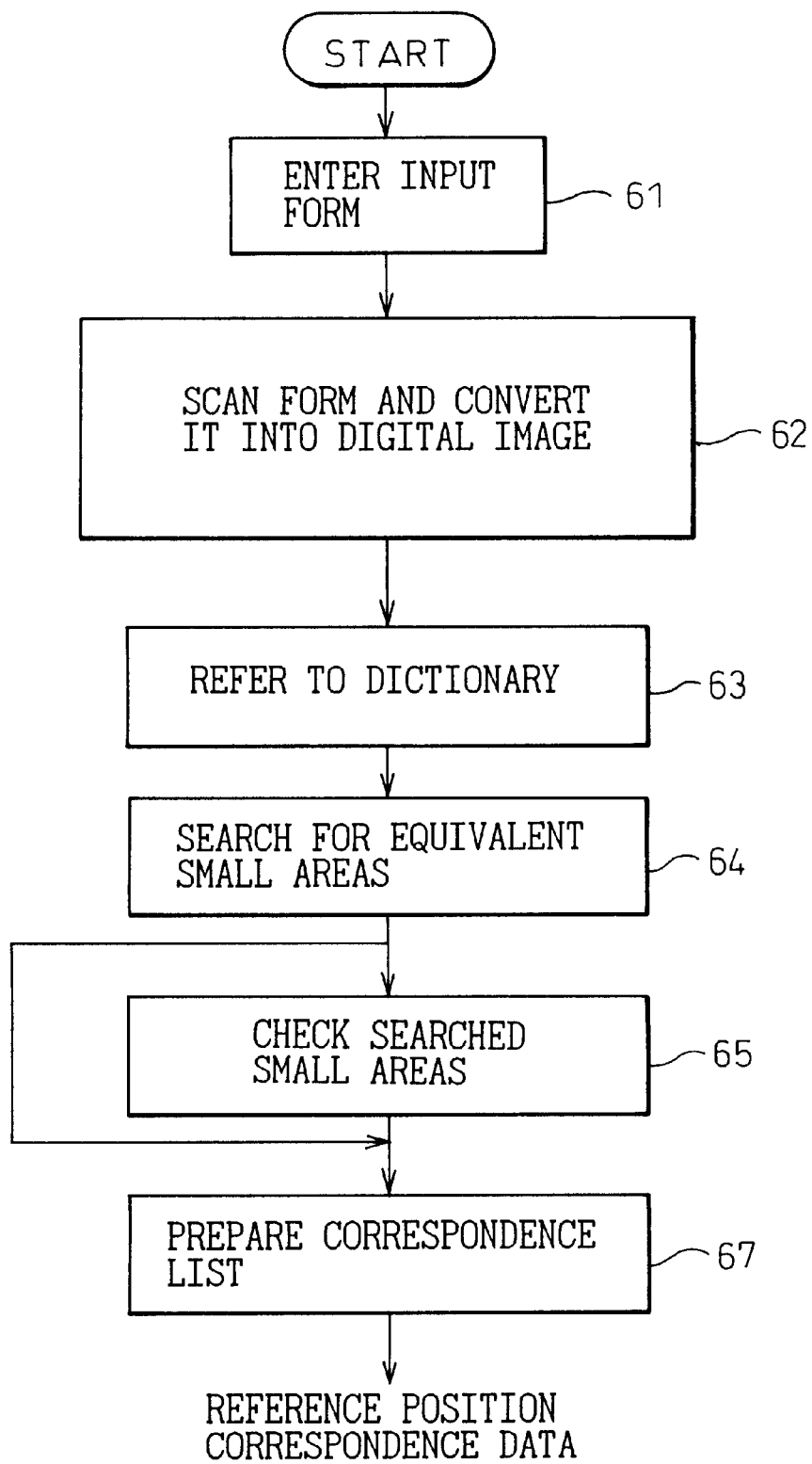
FIG. 6 is a flowchart showing a method of forming a reference position correspondence list by the apparatus of FIG. 4.

FIG. 6 is a flowchart showing a method of forming a corresponding list by the apparatus of FIG. 4. In step 61, the image scanner 1 scans the input form 46. In step 62, the image scanner 1 photoelectrically forms a digital image of the input form 46. Step 63 refers to the small reference areas stored in the dictionary memory 45, and step 64 retrieves equivalent small areas corresponding to the small reference areas from the input-form image. Step 65 checks the equivalent small areas to see if they are correct according to a technique to be explained later. Step 67 prepares a correspondence list showing the relationships between the equivalent and small reference areas.

The locating method according to the present invention will be explained in detail.

Outline of Locating Method

FIG. 7 shows an example of the learning form 41. This form relates to "吉尾さんを歓迎する会" (Mr. Yoshio's welcome party) and includes fixed information about the party. Copies of the learning form are delivered to the participants in the party, or a copy of the same is circulate among the participants. Columns of "名え" (Name), "出欠" (Attendance), and "リクエスト" (Request) printed at lower part of the form are crosshatched. Blank spaces under the crosshatched columns will be filled by handwriting by the members. Among the fixed information on the learning form, proper parts are selected as small reference areas and are stored in the dictionary memory 45 (FIG. 4). A method of selecting the small reference areas will be explained.

To improve a processing speed, a coarse image shown in FIG. 8 is generated from the digital image of the learning form of FIG. 7. For example, a coarse ratio of ¼ is employed to generate a coarse digital image of FIG. 8. The coarse image of FIG. 8 is already subjected to various preprocesses such as smoothing, to prepare data to be stored in the dictionary memory 45. Numerals 81 to 94 indicate small reference areas set in the coarse image of FIG. 8. Each of the small reference areas 81 to 94 is made of 32 dots by 32 dots in this embodiment. The coordinates of the small reference areas and patterns therein are stored in the dictionary memory 45.

Generating a coarse image is a kind of characteristic extraction and is made to absorb skew, contraction, and extension and improve the processing speed.

Figure 10:
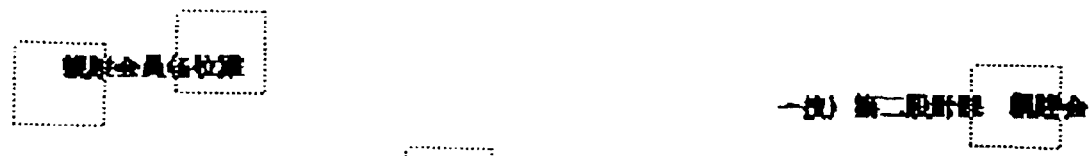
FIG. 10 shows a coarse image based on the image of FIG. 9.

FIG. 9 shows a copy of the learning form of FIG. 7 with spaces filled with handwritten information, and FIG. 10 shows a ¼-coarse image generated from the image of FIG. 9.

Equivalent small areas corresponding to the small reference areas of FIG. 8 are retrieved from the image of FIG. 10 according to an image matching technique. Small areas surrounded with dotted lines in FIG. 10 are the retrieved equivalent small areas. For example, the coordinates of the upper left corner of each retrieved small area is related to the coordinates of the upper left corner of a corresponding small reference area stored in the dictionary memory 45, to prepare a correspondence list of FIG. 11. This list shows relationships between 14 small reference areas and 14 equivalent small areas. Adjacent to a numeral of 2 in a dotted circle 111, there are numerals of 640, 788, 600, and 800 in a dotted circle 113. Among these numerals, 640 and 788 are the corner coordinates of one small reference area stored in the dictionary memory 45, and 600 and 800 are the corner coordinates of a retrieved equivalent small area corresponding to the small reference area in question. Beside a numeral of 1 in the dotted circle 111, there is a numeral of 14 in a dotted circle 112. This "14" indicates that there are 14 small areas in the list. These corresponding small areas in the list are used to find the coordinates of a point in the input-form image corresponding to a given point in the learning-form image.

Dictionary Forming Algorithm

Figure 12:
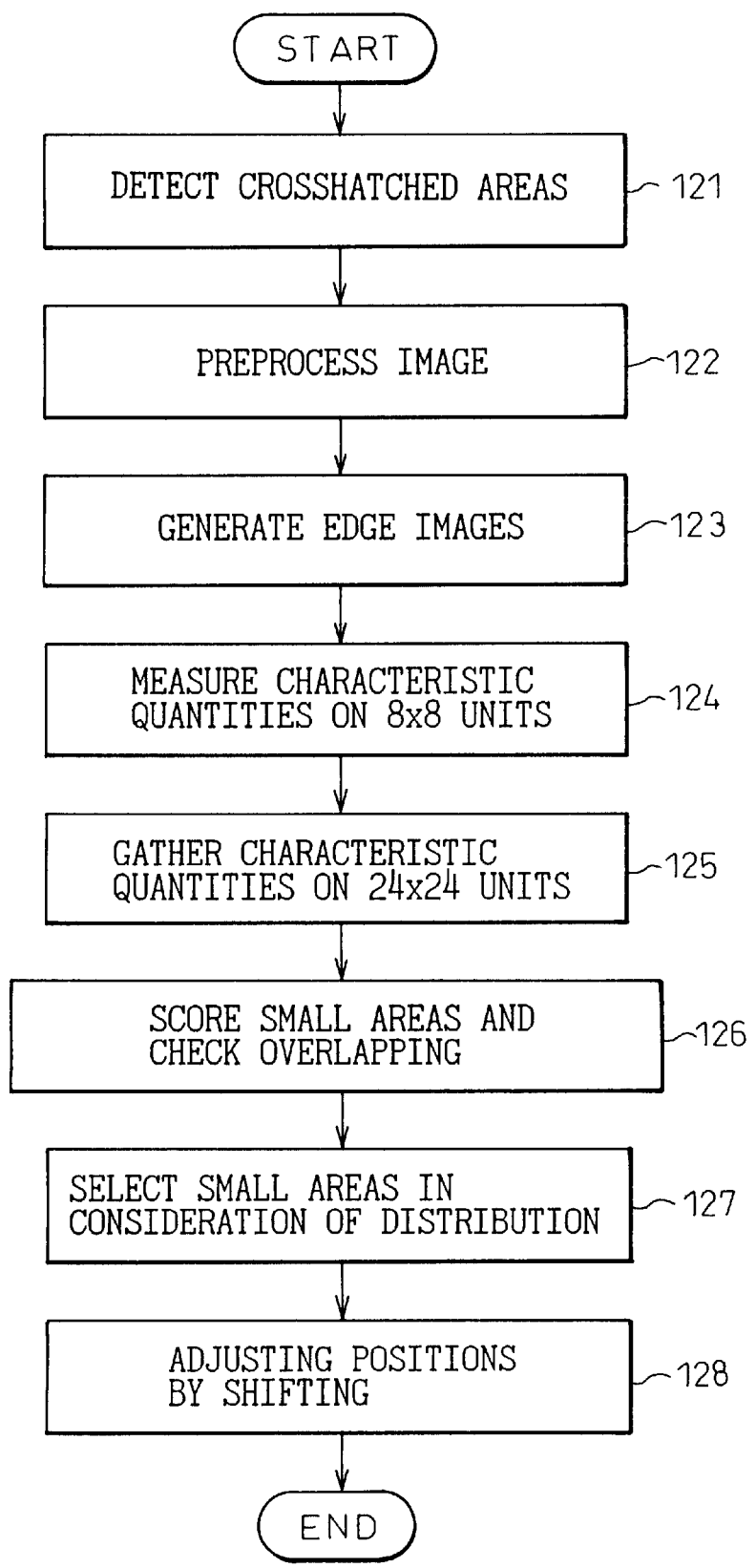
FIG. 12 is a flowchart showing the details of a dictionary forming algorithm of steps 54 and 55 of FIG. 5.

FIG. 12 is a flowchart showing the details of a dictionary forming algorithm carried out in steps 54 and 55 of FIG. 5.

(1) Detecting Crosshatched Areas and Solidly Shaded Areas (step 121)

Figure 13:
FIG. 13 shows a crosshatched area detected in the image of FIG. 7.

Step 121 detects the appearance frequencies and quantities of dots in the learning-form image of FIG. 7, to find out (i.e. detect) crosshatched areas. FIG. 13 shows an example of a crosshatched area detected in the image of FIG. 7. The same technique is used to find out solidly shaded areas (entirely blackened areas). These crosshatched and solidly shaded areas are improper to serve the small reference areas to be stored in the dictionary memory 45.

(2) Preprocessing (step 122)

Step 122 removes dirt from the learning-form image of FIG. 7, smoothes the same, and generates the ¼-coarse image of FIG. 8.

Step 122 is important in selecting the small reference areas and provides the coarse image of FIG. 8. The data actually stored in the dictionary memory 45 may be based on the image provided by step 122 or simply a ¼-coarsened image. In any case, the image of the input form 46 must be subjected to the same preprocesses.

To improve a processing speed, this embodiment simply carries out a ¼-coarsening operation on each image, and the data stored in the dictionary memory 45 is based on the ¼-coarsened image. This is the reason why FIGS. 8 and 10 provide slightly different nuances.

This coarsening ratio of ¼ is also used to locate an objective area on the image of the input form 46.

(3) Generating Edge Images (step 123)

Figure 14:
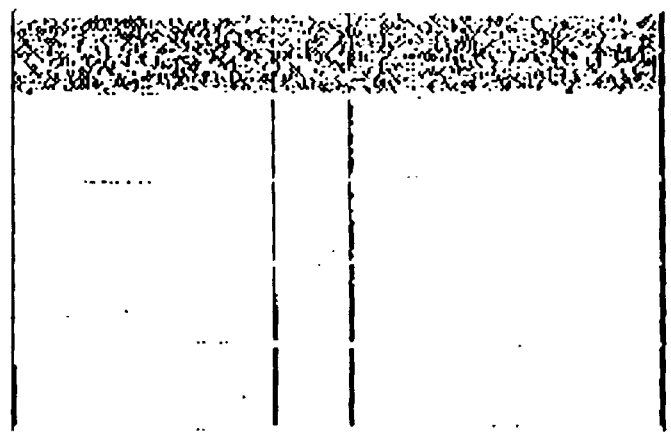
FIG. 14 shows a vertical edge image based on the image of FIG. 8.
Figure 15:
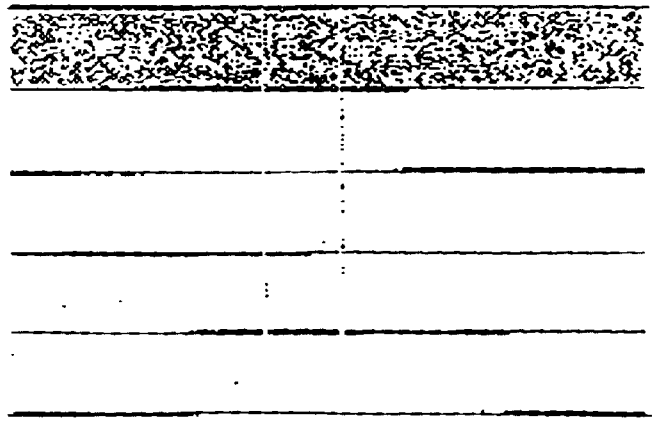
FIG. 15 shows a horizontal edge image based on the image of FIG. 8.

Step 123 extracts vertical and horizontal edges out of patterns in the learning-form image provided by step 122. Any one-dot pattern isolated from others by, for example, three dots or over is removed as dirt. FIG. 14 shows a vertical edge image generated from the image of FIG. 8, and FIG. 15 shows a horizontal edge image generated from the same.

(4) Measuring Edge Characteristic Quantities in 8×8-dot Units (step 124)

Although the small reference areas are selected based on 24×24-dot units, characteristic quantities are calculated for every 8×8-dot unit for the sake of speeding up calculations. Thereafter, the calculated characteristic quantities are used to select the small reference areas.

Figure 16:
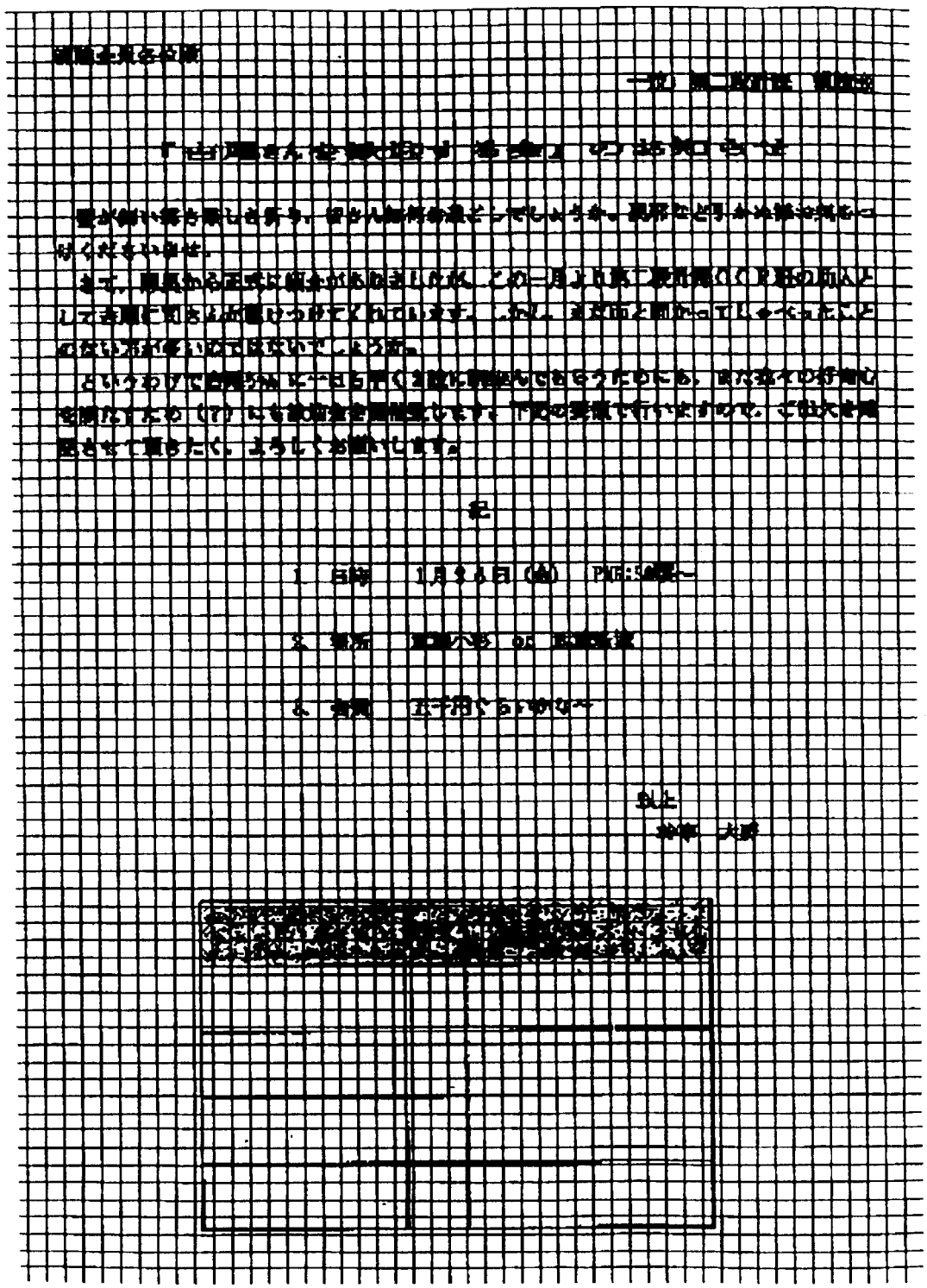
FIG. 16 shows a mesh of 8×8-dot units based on an edge image produced in step 123 of FIG. 12.

The edge images generated in step 123 are each divided into a mesh of 8×8-dot units as shown in FIG. 16, and characteristic quantities such as edge characteristic quantities are calculated for each of the units.

The characteristic quantities are mainly the numbers of dots counted in the edges of the images, and examples thereof are as follows:

nt: total edge quantity (the number of black pixels in edges)

nh: horizontal edge quantity (the number of black pixels in horizontal edges)

nv: vertical edge quantity (the number of black pixels in vertical edges)

nc: black pixel quantity (the number of black pixels)

hh: horizontally projected section vv: vertically projected section ng: improper quantity (crosshatched quantity)

Figure 17:
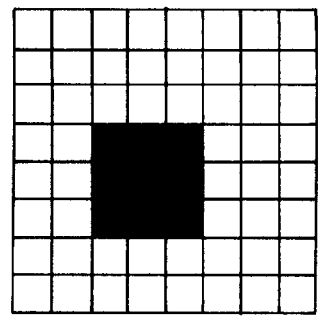
FIG. 17 is an enlarged view showing a candidate small area in the mesh of FIG. 16.

FIG. 17 is an enlarged view showing one 8×8-dot unit of the mesh of FIG. 16. For the sake of explanation, the unit contains a simple pattern. A method of measuring the characteristic quantities will be explained.

Figure 18:
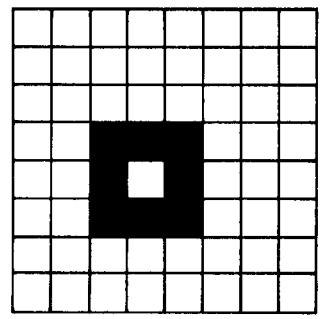
FIG. 18 is an edge image of the image of FIG. 17.

FIG. 18 shows an edge image of the image of FIG. 17. In the edge image, the total of black pixels is 8, which is the total edge quantity "nt."

Figure 19:
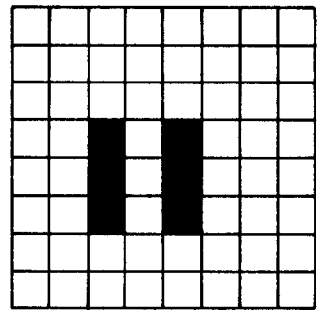
FIG. 19 is a vertical edge image of the image of FIG. 17.

FIG. 19 shows a vertical edge image in which the total of black pixels is 6, which is the vertical edge quantity "nv."

Figure 20:
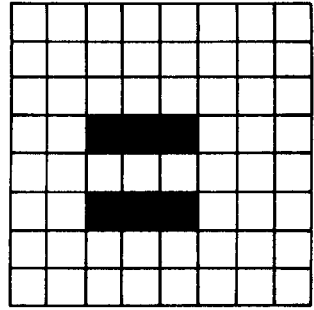
FIG. 20 is a horizontal edge image of the image of FIG. 17.

FIG. 20 shows a horizontal edge image in which the total number of black pixels is 6, which is the horizontal edge quantity "nh."

In FIG. 17, the total number of black pixels is 9, which is the black pixel quantity "nc."

Sectional data of "100011100" of vertical projection of the image of FIG. 17 is the vertically projected section "vv."

Sectional data of "00111000" of horizontal projection of the image of FIG. 17 is the horizontally projected section "hh."

The number of dots included in the crosshatched areas detected in (1) is counted in the 8×8-dot unit of FIG. 17 as the improper quantity "ng," which is zero in the example of FIG. 17.

The crosshatched areas and solidly shaded areas detected in (1) are based on the image that is not coarsened. Accordingly, the improper quantity ng must be converted into a coarsened value.

(5) Gathering Characteristic Quantities for 24×24-dot Units (step 125)

The characteristic quantities measured in 8×8-dot units in step 124 are gathered for 24×24-dot units, which are scored.

When scoring the 24×24-dot units, patterns at the peripheries thereof are not counted because the periphery of each small reference area (32×32 dots) is vulnerable to skew, contraction, and extension.

Figures 21, 22:
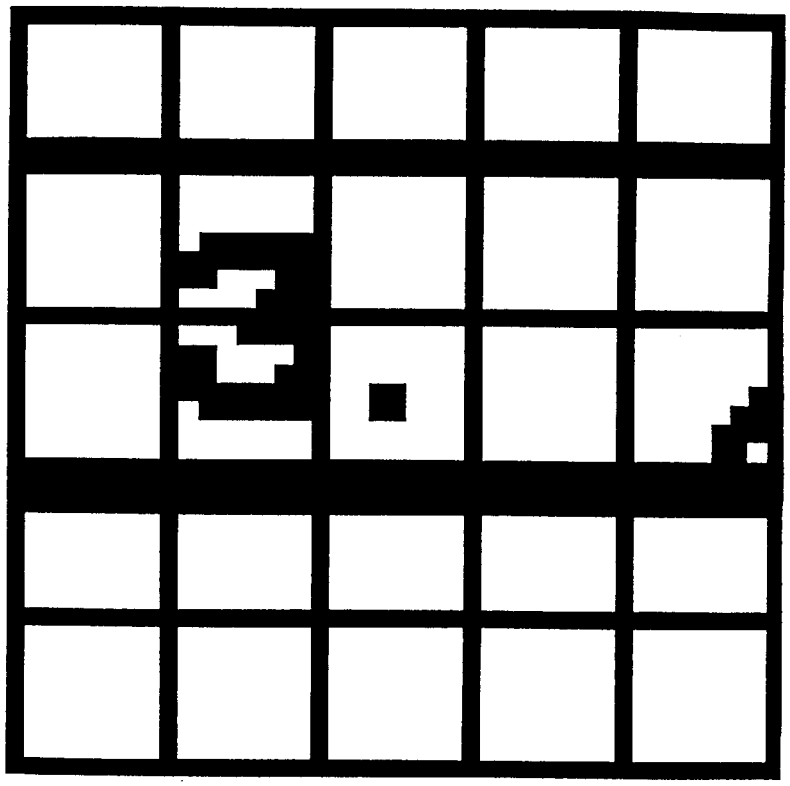
FIG. 21 shows a block of five 8×8-dot units (8×5=40 dots) by five 8×8-dot units (8×5=40 dots) provided with edge characteristic quantities.
FIG. 22 shows an inner region and an outer region of the area of FIG. 21.

Accordingly, the 8×8-dot units generated in step 124 are first gathered to form blocks each consisting of five vertical units (8×5=40 dots) by five horizontal units (8×5=40 dots) as shown in FIG. 21. Each 8×8-dot unit of FIG. 21 already has the characteristic quantities measured in step 124. The 40×40-dot block is divided into a central 24×24-dot unit A made of nine 8×8-dot units and a perimeter B made of sixteen 8×8-dot units. The characteristic quantities measured in step 124 are simply summed up for these A and B.

The total edge quantity of the central 24×24-dot unit A is AΣnt=nt[A1]+nt[A2]+ . . . +nt[A9].

The horizontal edge quantity AΣnh, vertical edge quantity AΣnv, black pixel quantity AΣnc, and improper quantity AΣng of the central 24×24-dot unit A are similarly calculated.

The vertically projected section of the central 24×24-dot unit A is AΣvv={(vv[A1] OR vv[A2] OR vv[A3])<<16} OR {(vv[A4] OR vv[A5] OR vv[A6])<<8} OR vv[A7] OR vv[A8] OR vv[A9], where <<16 represents a 16-bit shift, and <<8 represents a 8-bit shift.

The horizontally projected section AΣhh of the central 24×24-dot unit A is similarly calculated.

For example, if it is assumed that the hh[A1]=(00000001), hh[A2]=(00001000), hh[A3]=(10000000), hh[A4]= (00000010), hh[A5]=(00010000), hh[A6]=(01000000), hh[A7]=(00000100), hh[A8]=(00100000), and hh[A9]= (00100000), then A Σhh={(hh[A1] OR hh[A4] OR hh[A7] <<16} OR {(hh[A2] OR hh[A5] OR hh[A8])<<8} OR hh[A3] OR hh[A6] OR hh[A9] is calculated as:

|  | | |
|---|---|---|
|  | 00000111 .................... | 16-bit shift |
| OR | 00111000 ............ | 8-bit shift |
| OR | 11100000 |  |
|  | 000001110011100011100000 |  |

Similarly, the characteristic quantities BΣnt, BΣnh, BΣnv, BΣnc, and BΣng of the perimeter B are calculated.

It is preferable that the size of a pattern in each small reference area is in order to ensure finding an equivalent small area in the input-form image even if the input-form image is skewed, contracted, or extended. Accordingly, a lower limit is set on each of the vertical and horizontal edge quantities. If any one of BIT(AΣvv) and BIT(AΣhh) is below a given lower limit, the 40×40-dot block in question is invalidated. Here, BIT(n) indicates the number of Is in a row "n" made of 0 and 1. Consequently, any 40×40-dot block that contains only a vertical or horizontal edge will not serve as a small reference area.

Another means for measuring the size of a pattern in a given 40×40-dot block in which a small reference area may be selected is a run length.

In the central 24×24-dot unit A, vertical run length data v_run(0) to v_run(i) and horizontal run length data h_run (0) to h_run(j) are measured. Then, WV=root(Σv_run×v_ run) and WH=root(Σh_run×h_run) are calculated and are used as pattern width characteristics. These pattern width characteristics are reflected by the score of each candidate small reference area, so that a small area involving thicker lines may get a higher score.

As explained above, the actual size of each small reference area is 32×32 dots. However, the score of each small reference area is calculated based on the central 24×24-dot area A thereof.

Since the periphery of any small reference area may be incorrect (i.e. relatively unsuitable) because it is vulnerable to skew, contraction, and extension, it is preferable, therefore, if the periphery has no characteristics. Accordingly, if the density of the total edge quantity of the perimeter B of a given 40×40-dot block is greater than that of the central 24×24-dot unit A thereof, i.e., if $A\Sigma nt < B\Sigma nt \times \%_{16}$, the block is not adopted to provide a small reference area.

(6) Scoring Each Small Area and Carrying Out Overlapping Check (step 126)

The processes up to step 125 divide the learning-form image into a mesh of 8×8-dot units and find out various characteristic quantities for 24×24-dot units.

Step 126 scores each small area, which is a candidate for a small reference area, according to the characteristic quantities thereof and ranks the small areas.

Namely, step 126 weights the characteristic quantities obtained in step 125 as mentioned below, to obtain indexes, and arithmetically manipulates the indexes to sum up a total score:

$NC=(400-|400-A\Sigma nc|)\times 0.7$ $NV=A\Sigma nv \times 1.5$ $NH=A\Sigma nh \times 1.5$ $VV=WV \times 1.0$ $HH=WH \times 1.0$ $NG=(A\Sigma ng \times 2.0 + B\Sigma ng) \times 20.0$ $RN=(A\Sigma nc \times 10.0)/A\Sigma nt$ $PT \text{ (score)} = NC+NV+NH+VV+HH+RN-NG$ The weights mentioned above are examples, and optimum weights may be found empirically.

In this way, each candidate small area is scored, and larger the score, the more the small area is suitable, relatively for a small reference area. High-score small areas are easier to detect in the input-form image even if the image is skewed, contracted, or extended or has noise.

The index RN is obtained by dividing a weighted sum of black pixels in the central 24×24-dot unit A of a given 40×40-dot block by a sum of total edge quantities in the same unit A and serves to show the thickness of lines in the block. The larger the index RN, the thicker the lines. If the index RN is below a predetermined threshold, the candidate small area in question is less characteristic, and therefore, is not used as a small reference area.

The image matching technique may easily detect, in a given image, a pattern contained in an equivalent small area corresponding to a small reference area even if the image is skewed, contracted, or extended, or has noise. However, if the image involves many small areas having analogous patterns, it is impossible to relate the detected small area to the corresponding small reference area. To solve this problem, the peripheries of the central 24×24-dot unit A of each candidate small area are examined, and if there is a candidate small area having an analogous pattern is present within a predetermined range, the score for the small area in question drops.

Accordingly, even if a candidate small area is surely identifiable under skew, contraction, extension, or noise, the small area receives a low score if there is an analogous candidate small area in the vicinity thereof.

(7) Narrowing the Number of Candidate Small Areas (step 127)

Processes up to step 126 scores the central 24×24-dot unit of each candidate small area. Among the candidate small areas, proper ones must be picked up. Although small reference areas must have high scores, they also must be evenly distributed over the learning form 41. Narrowing the number of candidate small areas will be explained.

Starting from a candidate small area having a lower score, it is determined whether or not the vicinity of the small area in question involves a candidate small area having a higher score. If so, the small area in question is abandoned, and if not, it remains. As a result, only a small area having a higher score remains in a section where candidate small areas are densely present. On the other hand, in a section where candidate small areas are sparse, a small area having a relatively low score will remain.

There should be, however, an absolute threshold for scores, and any candidate small area having a score below the threshold must be abandoned.

For example, there are candidate small areas A to J that are linearly distributed and have the following scores:

A(300), B(400), C(250), D(600), E(100), F(200), G(600), H(500), I(400), J(500)

Adjacent small areas are compared and selected as mentioned above, and the small areas B, D, G, and J will remain.

If they are selected simply by their scores, only the small areas D, G, H, and J will remain. These small areas, however, are biased toward one side because their respective relative distributions were not considered.

(8) Adjusting Small Areas by Shifting Them (step 128)

The processes mentioned above may select small reference areas having stable characteristics suitable for the image matching and locating operations.

Step 126 selects candidate small areas whose peripheries are less characteristic. Namely, the candidate small areas remaining at step 128 have all passed the filtering conditions. Each candidate small area, however, has a possibility of having an optimum position in the close vicinity thereof.

Since the comparison operations in step 126 are based on the 8×8-dot units, each candidate small area may have an optimum position within the range of eight dots.

Accordingly, the central 24×24-dot unit of each candidate small area is shifted toward the periphery thereof, and the characteristic quantity of only the periphery thereof is measured. Then, a 32×32-dot small area having the least peripheral characteristic quantity is determined.

These processes automatically select the small reference areas of FIG. 8 from the learning-form image of FIG. 7. These small reference areas are used for locating a target part on an input form. Even if the input form is skewed, contracted, or extended, the small reference areas are effective to locate the target part.

Setting Data About Read Area, etc. (step 53 of FIG. 5)

When carrying out the image matching technique on a binary image, handwritten characters are only noise. This sort of noise may cause a matching error. Accordingly, an area that is going to be filled with handwritten characters, etc., must be excluded when selecting small reference areas.

A character recognition apparatus has a dictionary such as the read area dictionary 50 of FIG. 4, for recording the coordinates of each read area on a given form.

The data stored in the read area dictionary 50 is used to form a read area map through mapping and conversion, similar to the crosshatched areas. When calculating characteristic quantities, the crosshatched areas as well as the read areas are counted into the improper characteristic quantity ng. As a result, the crosshatched areas and the read areas (fill-in areas) are excluded when selecting small reference areas, to improve the accuracy of locating a target part on an input form.

Simulations of Searching for Small Areas (step 57 of FIG. 5)

Any image that is skewed, contracted, or extended involves a deformation that causes a matching error. The degrees of influence of skew, contraction, and extension are greatly dependent on patterns contained in the image. FIG. 23 shows an example of a pattern that is not affected by skew. The pattern is turned by 90 degrees between the left and right sides of the figure. There is no difference between the right and left sides, and therefore, this pattern never causes an image matching error. FIG. 24 shows an example of a pattern that is vulnerable to skew. The pattern is turned by 90 degrees between the left and right sides of the figure. The pattern has only a slight overlapping part between the left and right sides. Namely, the pattern of FIG. 24 is vulnerable to skew and causes a matching error.

Actually, each small reference area includes an intricate pattern, which is not simply a circle or a straight line.

To properly select small reference areas among candidate small areas, step 57 of FIG. 5 generates several deformed images from the image of the learning form 41 with the use of combinations of allowances of skew, contraction, and extension. The candidate small areas provided by step 55 of FIG. 5 are searched for in each of these deformed images with the image matching technique. Any candidate small area that has correctly been identified in a predetermined number of the deformed images is adopted as a small reference area.

Since each candidate small area is picked up from the learning-form image, the coordinates thereof on a given deformed image are calculable by modifying the coordinates of the small area on the learning-form image with the use of the skew, contraction, and extension parameters used for generating the deformed image. Thereafter, the distance between the calculated coordinates in the deformed image and the coordinates searched in the deformed image is measured to determine the degree of correctness of the candidate small area in question.

The degree of correctness of each candidate small area is used to determine the withstanding ability of the small area. If the withstanding ability is low, the small area is not selected as a small reference area. As a result, only small areas that are stable and correct with respect to skew, contraction, and extension are selected as small reference areas and are stored in the dictionary memory 45.

For example, five degrees of skew, 90% to 110% of vertical extension/contraction, and 90% to 110% of horizontal extension/contraction are set as allowances on the input form 46. Then, candidate small areas are tested with eight deformed images that are generated from the image of the learning form 41 with the use of the following eight combinations of the above-mentioned allowances:

1: left skew of 5 degrees, vertical contraction/extension of 110%, and horizontal extension/contraction of 110%
2: right skew of 5 degrees, vertical contraction/extension of 110%, and horizontal extension/contraction of 110%
3: left skew of 5 degrees, vertical contraction/extension of 90%, and horizontal extension/contraction of 110%
4: right skew of 5 degrees, vertical contraction/extension of 90%, and horizontal extension/contraction of 110%
5: left skew of 5 degrees, vertical contraction/extension of 110%, and horizontal extension/contraction of 90%
6: right skew of 5 degrees, vertical contraction/extension of 110%, and horizontal extension/contraction of 90%
7: left skew of 5 degrees, vertical contraction/extension of 90%, and horizontal extension/contraction of 90%
8: right skew of 5 degrees, vertical contraction/extension of 90%, and horizontal extension/contraction of 90%

The coordinates of the candidate small areas in the learning-form image are converted into coordinates in the deformed images according to the eight combinations of the allowances. These coordinates in the deformed images serve as correct deformed coordinates.

Thereafter, the candidate small areas are actually searched for in the deformed images with the image matching technique, and the distances between the searched small areas and the small areas having the correct deformed coordinates are measured. Then, the distances are compared with a threshold, to determined whether or not the searched small areas are correct.

Any candidate small area showing a correctness ratio greater than a predetermined level is adopted as a small reference area. For example, if a candidate small area is correctly searched in six of the eight deformed images, the small area will be adopted as a small reference area. Otherwise, the small area is determined not to withstand skew, contraction, or extension and is abandoned.

Manually Selecting Small Areas (step 56 of FIG. 5)

Small areas automatically selected from the image of the learning form 41 are substantially proper for image matching. There are, however, uncountable variations in patterns set on a form, and automatically selected small areas may not always be proper for a variety of patterns. If improper small reference areas are stored in the dictionary memory 45, they must be removed therefrom.

Alternatively, a user may select proper small areas that have not automatically been selected and may additionally store them in the dictionary memory 45.

For this purpose, the data stored in the dictionary memory 45 may be displayed on a screen, and with a graphical user interface (GUI), the user may set proper small areas on the displayed image so that they may be used as small reference areas. The GUI lets the user easily edit, add, and remove small areas on the screen, and thus, provides the locating apparatus of the present invention with flexibility. In some case, the user may manually set every small reference area for a given form.

Checking Searched Small Areas (step 65 of FIG. 6)

Searching equivalent small areas corresponding to small reference areas in the image of an input form is affected by skew, contraction, extension, or noise in the input-form image. In addition, patterns in the input-form image analogous to patterns in the small reference areas may cause an image matching error. A technique of checking such an image matching error will be explained. This technique improves the locating accuracy of the present invention.

Three equivalent small areas corresponding to three small reference areas stored in the dictionary memory 45 are searched for in the image of an input form. The small reference areas have upper left corners A1, A2, A3, respectively. These points A1, A2, A3 serve as apexes to form a triangle ΔA. The searched small areas in the input-form image involve three points B1, B2, and B3 that serve as apexes to form a triangle ΔB.

Figure 25:
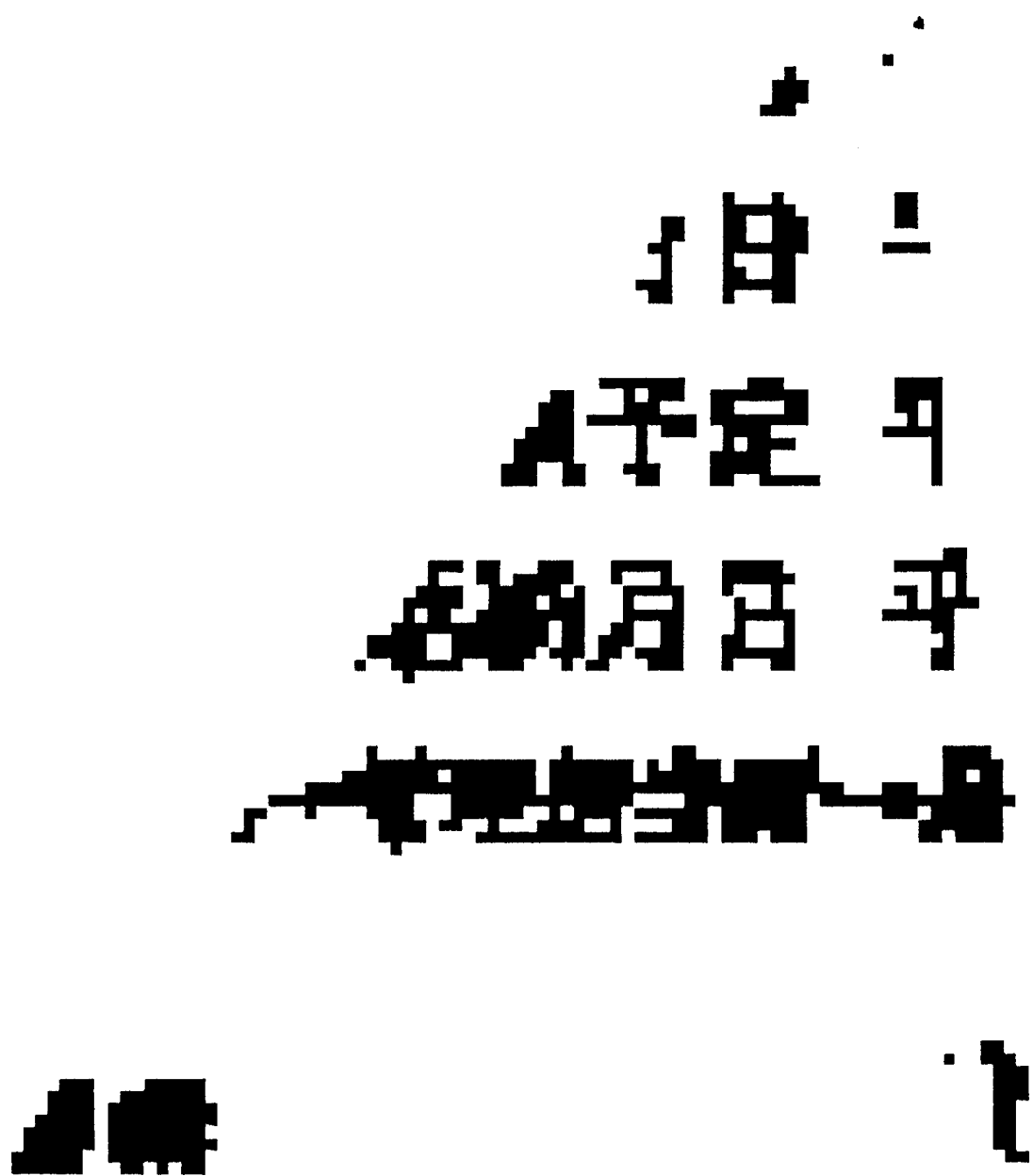
FIG. 25 shows a triangle ΔA with its apexes being contained in three small reference areas.
Figure 26:
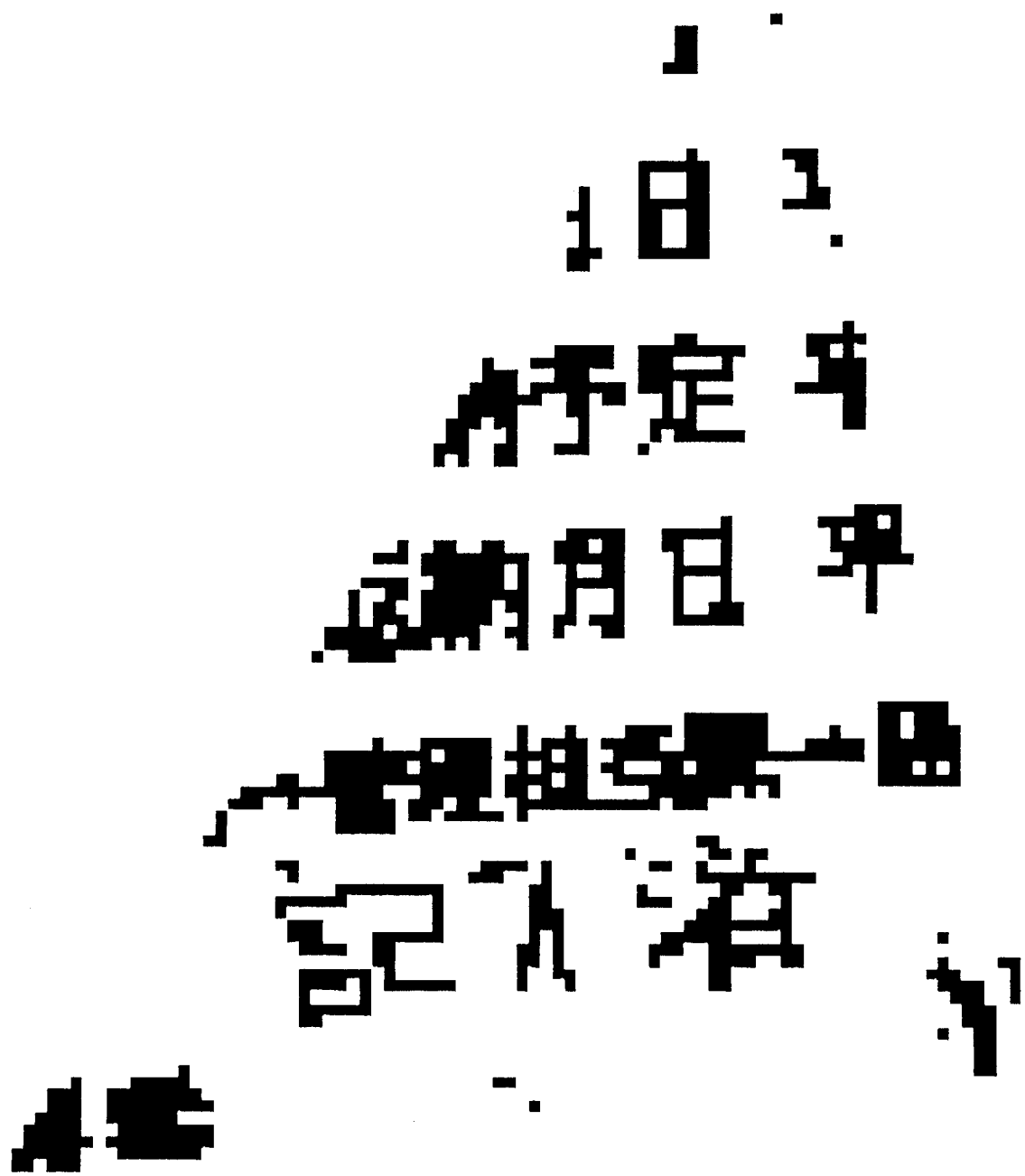
FIG. 26 shows a triangle ΔB with its apexes being contained in three equivalent small areas retrieved from the input-form image.

FIG. 25 shows the triangle ΔA whose apexes are contained in the small reference areas stored in the dictionary memory 45. FIG. 26 shows the triangle ΔB whose apexes are contained in the equivalent small areas searched by image matching in the input-form image.

An optional point C in the triangle ΔA is expressed as follows:

$$C = m \times Vec(A1, A2) + n \times Vec(A1, A3)$$

where m and n are optional constants and Vec(N1, N2) is a vector from a point N1 to a point N2.

The triangle ΔA is mapped to the triangle ΔB. Then, the point C in the triangle ΔA corresponds to a point D in the triangle ΔB. The point D is expressed as follows:

D=m×Vec(B1, B2)+n×Vec(B1, B3)

Figure 27:
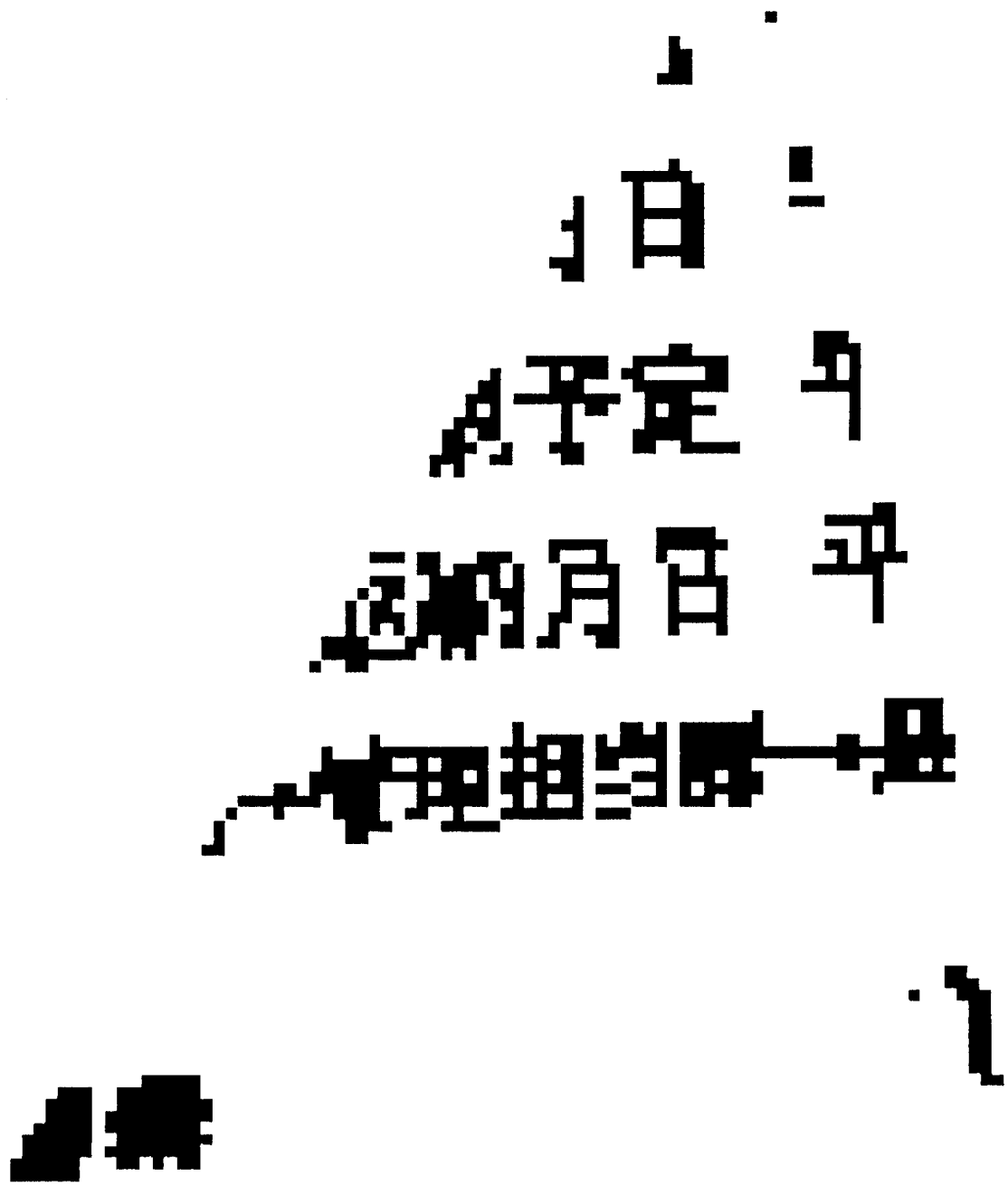
FIG. 27 shows a triangle ΔE formed by deforming the triangle ΔA of FIG. 25 and making it congruent to the triangle ΔB of FIG. 26.
Figure 28:
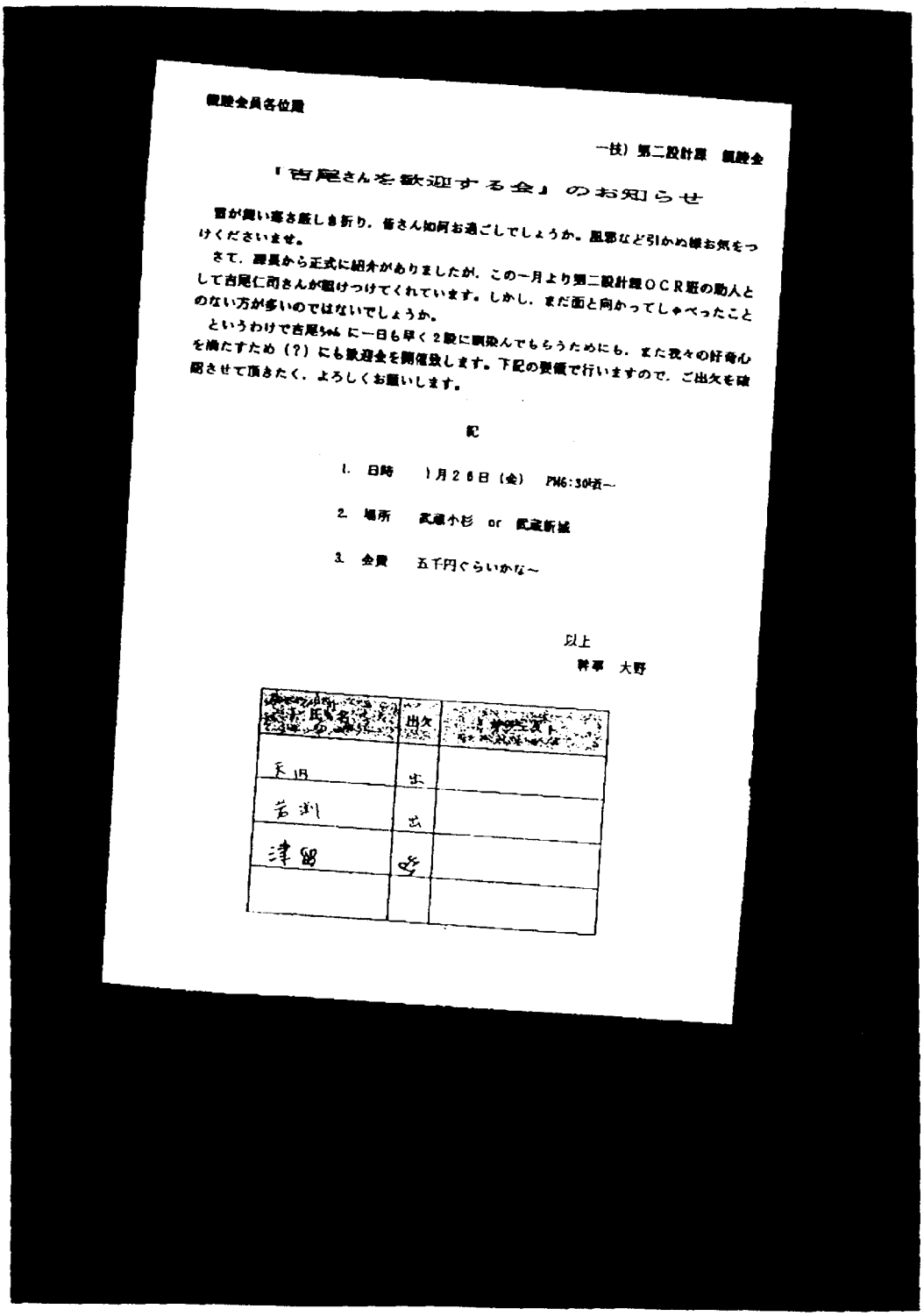
FIG. 28 explains a locating technique according to a prior art.

In this way, the triangle ΔA of FIG. 25 is deformed into a triangle ΔE of FIG. 27 that is congruent with the triangle ΔB of FIG. 26. Due to the deformation, the inside pattern of the triangle ΔA is mapped to the triangle ΔE.

Then, the inside patterns of the triangles ΔE and ΔB are checked to see if they match with each other. If the equivalent small areas including the three apexes B1, B2, and B3 are all correct, the inside patterns of the triangles will match with each other. If they are incorrect, they will not match with each other. In this way, it is possible to determine whether or not the equivalent small areas have been correctly searched for.

The above embodiment maps the triangle ΔA to the triangle ΔB because the triangle ΔA involves a smaller number of black pixels, i.e., a smaller number of calculations when deforming the triangle ΔA into the triangle ΔE. This results in improving a processing speed. However, it is naturally possible to map the triangle ΔB to the triangle ΔA when checking the searched small areas.

Although the embodiments relate to recognizing an area to be filled with handwritten characters in the image of a form read by OCR, the present invention is not limited to these embodiments. For example, the present invention is applicable to recognizing a printing area on a form having fixed information, when printing characters into the printing area.

As explained above, the present invention provides a locating apparatus, a locating method, and a locating program that use parts of patterns on a given form as marks to locate a target part on an image of the form by OCR having no black background function. The present invention needs no specific marks printed on the form and is capable of locating an optional part on the form irrespective of whether or not the form has ruled lines. The present invention also provides a recording medium for storing the locating program.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An apparatus for locating an objective on a sheet, comprising:
   a selector selecting a predetermined number of small reference areas in an image of a learning sheet having fixed information;
   a memory storing data about the selected small reference areas;
   a retriever collating an image of an input sheet, which contains the same information as the fixed information, with the data stored in the memory, and retrieving equivalent small areas corresponding to the small reference areas from the image of the input sheet; and
   a locator locating a position in the image of the input sheet corresponding to a given position on the learning sheet, according to relationships between the small reference areas and the equivalent small areas,
   wherein the selector further comprises:
      an edge extractor extracting an edge image having the small reference areas from the image of the learning sheet; and
      an optimum small area selector selecting, according to the edge image, optimum small areas for the small reference areas.

2. An apparatus for locating an objective on a sheet, comprising:
   a selector selecting a predetermined number of small reference areas in an image of a learning sheet having fixed information;
   a memory storing data about the selected small reference areas;
   a retriever collating an image of an input sheet, which contains the same information as the fixed information, with the data stored in the memory, and retrieving equivalent small areas corresponding to the small reference areas from the image of the input sheet; and
   a locator locating a position in the image of the input sheet corresponding to a given position on the learning sheet, according to relationships between the small reference areas and the equivalent small areas,
   wherein
      the selector further comprises:
         an edge extractor extracting an edge image from the image of the learning sheet; and
         an optimum small area selector selecting, according to the edge image, optimum small areas for the small reference areas, and
      the optimum small area selector further comprises:
         a small unit divider dividing the edge image into small units;
         a characteristic quantity calculator calculating a characteristic quantity for each of the small units according to the edge image, the characteristic quantity indicating the relative suitability of the small unit for use as a small reference area;
         a large unit collector collecting a predetermined number of the small units into a large unit; and
         a large unit scorer calculating a score of each of the large units according to the characteristic quantities of the small units in the large unit, the score indicating the relative suitability of the large unit for use as a small reference area,
         the small reference areas being selected among the large units sequentially from those having higher scores.

3. The apparatus of claim 2, wherein the characteristic quantity calculator calculates the characteristic quantity of each small unit according to the number of black pixels in edges in the small unit and the total number of black pixels in the small unit.

4. The apparatus of claim 3, wherein the characteristic quantity calculator calculates an improper characteristic quantity for each small unit according to the number of pixels of a crosshatched area contained in the small unit, the improper characteristic quantity indicating the relative unsuitability of the small unit to serve as a small reference area.

5. The apparatus of claim 3, wherein the characteristic quantity calculator calculates an improper characteristic quantity according to the number of pixels of a read area contained in the small unit, the improper characteristic quantity indicating the relative unsuitability of the small unit to serve as a small reference area.

6. An apparatus for locating an objective on a sheet, comprising:
   a selector selecting a predetermined number of small reference areas in an image of a learning sheet having fixed information;

a memory storing data about the selected small reference areas;

a retriever collating an image of an input sheet, which contains the same information as the fixed information, with the data stored in the memory, and retrieving equivalent small areas corresponding to the small reference areas from the image of the input sheet; and a locator locating a position in the image of the input sheet corresponding to a given position on the learning sheet, according to relationships between the small reference areas and the equivalent small areas, wherein the selector has an optimizer function which
uses combinations of limit values of skew, contraction, and extension to form deformed images of the learning sheet based on the image of the learning sheet,
uses the deformed images as input images to search for the small reference areas therein,
tests the searched small reference areas with a predetermined value to see if the searched small reference areas are correct, and
abandons any one of the searched small reference areas that shows a predetermined number of errors, to thereby optimize the small reference areas.

7. An apparatus for locating an objective on a sheet, comprising:

a selector selecting a predetermined number of small reference areas in an image of a learning sheet having fixed information;

a memory storing data about the selected small reference areas;

a retriever collating an image of an input sheet, which contains the same information as the fixed information, with the data stored in the memory, and retrieving equivalent small areas corresponding to the small reference areas from the image of the input sheet; and a locator locating a position in the image of the input sheet corresponding to a given position on the learning sheet, according to relationships between the small reference areas and the equivalent small areas, wherein the locator has a correctness function which
selects three of the small reference areas stored in the memory to serve as apexes of a first triangle,
retrieves three small areas from the image of the input sheet according to the three small reference areas, to serve as apexes of a second triangle,
selects one of the first and second triangles as a reference triangle;
deforms the other triangle into a third triangle that is congruent to the reference triangle,
checks to see if an inside pattern of the third triangle agrees with an inside pattern of the reference triangle, and
if the inside patterns agree with each other more on the basis of a predetermined evaluation level, determines that the retrieved three small areas are correct.

8. The apparatus of claim 1, further comprising an optical character reader, wherein the selector further comprises a manual selector operable by a user of the optical character reader to select optional small areas from the learning sheet as the small reference areas.

9. A method of locating an objective on a sheet, comprising:

selecting a predetermined number of small reference areas in an image of a learning sheet having fixed information;

storing data about the selected small reference areas;

collating an image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the selecting further comprises:
extracting an edge image having the small reference areas from the image of the learning sheet; and
selecting, according to the edge image, optimum small areas for the small reference areas.

10. A method of locating an objective on a sheet, comprising:

selecting a predetermined number of small reference areas in an image of a learning sheet having fixed information;

storing data about the selected small reference areas;

collating an image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the selecting further comprises:
extracting an edge image from the image of the learning sheet; and
selecting, according to the edge image, optimum small areas for the small reference areas, and
the optimum small areas are selected in accordance with:
dividing the edge image into small units;
calculating a characteristic quantity for each of the small units according to the edge image, the characteristic quantity indicating the relative suitability of the small unit for use as a small reference area;
collecting a predetermined number of the small units into a large unit;
calculating a score of each of the large units according to the characteristic quantities of the small units in the large unit, the score indicating the relative suitability of the large unit for use as a small reference area; and
selecting the small reference areas among the large units sequentially from those having higher scores.

11. The method of claim 10, wherein the characteristic quantity calculating further comprises:

calculating the characteristic quantity of each small unit according to the number of black pixels in edges in the small unit and the total number of black pixels in the small unit.

12. The method of claim 11, wherein the characteristic quantity calculating further comprises:

calculating an improper characteristic quantity for each small unit according to the number of pixels of a crosshatched area contained in the small unit, the improper characteristic quantity indicating the relative unsuitability of the small unit to serve as a small reference area.

13. The method of claim 11, wherein the characteristic quantity calculating further comprises:
    calculating an improper characteristic quantity according to the number of pixels of a read area contained in the small unit, the improper characteristic quantity indicating the relative unsuitability of the small unit to serve as a small reference area.

14. A method of locating an objective on a sheet, comprising:
    selecting a predetermined number of small reference areas in an image of a learning sheet having fixed information;
    storing data about the selected small reference areas;
    collating an image of an input sheet, which contains the same information as the fixed information, with the data stored in the memory, and retrieving equivalent small areas corresponding to the small reference areas from the image of the input sheet; and
    locating a position in the image of the input sheet corresponding to a given position on the learning sheet, according to relationships between the small reference areas and the equivalent small areas,
    wherein the selecting further comprises
        using combinations of limit values of skew, contraction, and extension to form deformed images of the learning sheet based on the image of the learning sheet;
        using the deformed images as input images to search for the small reference areas therein;
        testing the searched small reference areas with a predetermined value to see if the searched small references areas are correct; and
        abandoning any one of the small reference areas that shows a predetermined number of errors, thereby optimizing the small reference areas.

15. A method of locating an objective on a sheet, comprising:
    selecting a predetermined number of small reference areas in an image of a learning sheet having fixed information;
    storing data about the selected small reference areas;
    collating an image of an input sheet, which contains the same information as the fixed information, with the data stored in the memory, and retrieving equivalent small areas corresponding to the small reference areas from the image of the input sheet; and
    locating a position in the image of the input sheet corresponding to a given position on the learning sheet, according to relationships between the small reference areas and the equivalent small areas,
    wherein the locating further comprises
        selecting three of the small reference areas stored in the memory to serve as apexes of a first triangle;
        retrieving three small areas from the image of the input sheet according to the three small reference areas, to serve as apexes of a second triangle;
        selecting one of the first and second triangles as a reference triangle;
        deforming the other triangle into a third triangle that is congruent to the reference triangle;
        checking to see if an inside pattern of the third triangle agrees with an inside pattern of the reference triangle; and
        determining, if the inside patterns agree with each other on the basis of a predetermined evaluation level, that the retrieved three small areas are correct.

16. The method of claim 9, wherein the selecting further comprises letting a user of an optical character reader select optional small areas from the learning sheet as the small reference areas.

17. A computer readable storage medium encoded with a program of instructions for controlling a computer by:
    selecting a predetermined number of small reference areas in an image of a learning sheet having fixed information;
    storing data about the selected small reference areas;
    collating image of an input sheet, which contains the same information as the fixed information, with the data stored in the memory, and retrieving equivalent small areas corresponding to the small reference areas from the image of the input sheet; and
    locating a position in the image of the input sheet corresponding to a given position on the learning sheet, according to relationships between the small reference areas and the equivalent small areas,
    wherein the selecting further comprises:
        extracting an edge image having the small reference areas from the image of the learning sheet; and
        selecting, according to the edge image, optimum small areas for the small reference areas.

18. A computer readable storage medium encoded with a program of instructions for controlling a computer by:
    selecting a predetermined number of small reference areas in an image of a learning sheet having fixed information;
    storing data about the selected small reference areas;
    collating image of an input sheet, which contains the same information as the fixed information, with the data stored in the memory, and retrieving equivalent small areas corresponding to the small reference areas from the image of the input sheet; and
    locating a position in the image of the input sheet corresponding to a given position on the learning sheet, according to relationships between the small reference areas and the equivalent small areas,
    wherein
        the selecting further comprises:
            extracting an edge image from the image of the learning sheet; and
            selecting, according to the edge image, optimum small areas for the small reference areas, and
        the optimum small areas are selected in accordance with:
            dividing the edge image into small units;
            calculating a characteristic quantity for each of the small units according to the edge image, the characteristic quantity indicating the relative suitability of the small unit for use as a small reference area;
            collecting a predetermined number of the small units into a large unit;
            calculating a score of each of the large units according to the characteristic quantities of the small units in the large unit, the score indicating the relative suitability of the large unit for use as a small reference area; and
            selecting the small reference areas among the large units sequentially from those having higher scores.

19. The computer readable storage medium of claim 18, wherein the characteristic quantity calculating further comprises:

calculating the characteristic quantity of each small unit according to the number of black pixels in edges in the small unit and the total number of black pixels in the small unit.

20. The computer readable storage medium of claim 19, wherein the characteristic quantity calculating further comprises:

calculating an improper characteristic quantity for each small unit according to the number of pixels of a crosshatched area contained in the small unit, the improper characteristic quantity indicating the relative unsuitability of the small unit to serve as a small reference area.

21. The computer readable storage medium of claim 19, wherein the characteristic quantity calculating further comprises:

calculating an improper characteristic quantity according to the number of pixels of a read area contained in the small unit, the improper characteristic quantity indicating the relative unsuitability of the small unit to serve as a small reference area.

22. A computer readable storage medium encoded with a program of instructions for controlling a computer by:

selecting a predetermined number of small reference areas in an image of a learning sheet having fixed information;

storing data about the selected small reference areas;

collating image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the selecting further comprises
using combinations of limit values of skew, contraction, and extension to form deformed images of the learning sheet based on the image of the learning sheet;
using the deformed images as input images to search for the small reference areas therein;
testing the searched small reference areas with a predetermined value to see if the searched small reference areas are correct; and
abandoning any one of the small reference areas that shows a predetermined number of errors, thereby optimizing the small reference areas.

23. A computer readable storage medium encoded with a program of instructions for controlling a computer by:

selecting a predetermined number of small reference areas in an image of a learning sheet having fixed information;

storing data about the selected small reference areas;

collating image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the locating further comprises selecting three of the small reference areas stored in the memory to serve as apexes of a first triangle;
retrieving three small areas from the image of the input sheet according to the three small reference areas, to serve as apexes of a second triangle;
selecting one of the first and second triangles as a reference triangle;
deforming the other triangle into a third triangle that is congruent to the reference triangle;
checking to see if an inside pattern of the third triangle agrees with an inside pattern of the reference triangle; and
determining, if the inside patterns agree with each other on the basis of a predetermined evaluation level, that the retrieved three small areas are correct.

24. The computer readable storage medium of claim 17, wherein the selecting further comprises letting a user of an optical character reader select optional small areas from the learning sheet as the small reference areas.

25. A computer implemented method for locating an object on a sheet having fixed information, comprising:

selecting small reference areas from detected fixed information in an image of a learning sheet having the fixed information;

storing data about the selected small reference areas;

collating an image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the selecting further comprises:
extracting an edge image having the small reference areas from the image of the learning sheet; and
selecting, according to the edge image, optimum small areas for the small reference areas.

26. A computer implemented method for locating an object on a sheet having fixed information, comprising:

selecting small reference areas from detected fixed information in an image of a learning sheet having the fixed information;

storing data about the selected small reference areas;

collating an image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein
the selecting further comprises:
extracting an edge image from the image of the learning sheet; and
selecting, according to the edge image, optimum small areas for the small reference areas, and
the optimum small areas are selected in accordance with:
dividing the edge image into small units;
calculating a characteristic quantity for each of the small units according to the edge image, the characteristic quantity indicating the relative suitability of the small unit for use as a small reference area;

collecting a predetermined number of the small units into a large unit;

calculating a score of each of the large units according to the characteristic quantities of the small units in the large unit, the score indicating the relative suitability of the large unit for use as a small reference area; and selecting the small reference areas among the large units sequentially from those having higher scores.

27. The computer implemented method of claim 26, wherein the characteristic quantity calculating further comprises:

calculating the characteristic quantity of each small unit according to the number of black pixels in edges in the small unit and the total number of black pixels in the small unit.

28. The computer implemented method of claim 27, wherein the characteristic quantity calculating further comprises:

calculating an improper characteristic quantity for each small unit according to the number of pixels of a crosshatched area contained in the small unit, the improper characteristic quantity indicating the relative unsuitability of the small unit to serve as a small reference area.

29. The computer implemented method of claim 27, wherein the characteristic quantity calculating further comprises:

calculating an improper characteristic quantity according to the number of pixels of a read area contained in the small unit, the improper characteristic quantity indicating the relative unsuitability the small unit to serve as a small reference area.

30. A computer implemented method for locating an object on a sheet having fixed information, comprising:

selecting small reference areas from detected fixed information in an image of a learning sheet having the fixed information;

storing data about the selected small reference areas;

collating an image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the selecting further comprises using combinations of limit values of skew, contraction, and extension to form deformed images of the learning sheet based on the image of the learning sheet;

using the deformed images as input images to search for the small reference areas therein;

testing the searched small reference areas with a predetermined value to see if the searched small reference areas are correct; and abandoning any one of the small reference areas that shows a predetermined number of errors, thereby optimizing the small reference areas.

31. A computer implemented method for locating an object on a sheet having fixed information, comprising:

selecting small reference areas from detected fixed information in an image of a learning sheet having the fixed information;

storing data about the selected small reference areas;

collating an image of an input sheet, which contains the same information as the fixed information, with the data stored in the memory, and retrieving equivalent small areas corresponding to the small reference areas from the image of the input sheet; and locating a position in the image of the input sheet corresponding to a given position on the learning sheet, according to relationships between the small reference areas and the equivalent small areas, wherein the locating further comprises selecting three of the small reference areas stored in the memory to serve as apexes of a first triangle;

retrieving three small areas from the image of the input sheet according to the three small reference areas, to serve as apexes of a second triangle;

selecting one of the first and second triangles as a reference triangle;

deforming the other triangle into a third triangle that is congruent to the reference triangle;

checking to see if an inside pattern of the third triangle agrees with an inside pattern of the reference triangle; and determining, if the inside patterns agree with each other on the basis of a predetermined evaluation level, that the retrieved three small areas are correct.

32. The computer implemented method of claim 25, wherein the selecting further comprises letting a user select optional small areas from the learning sheet as the small reference areas.

33. The apparatus of claim 1, wherein the selector selects the small reference areas from patterns created from detected fixed information of the learning sheet.

34. The apparatus of claim 1, wherein at least one of the small reference areas comprise a detected character string.

35. The method of claim 9, wherein the selecting of the predetermined number of small reference areas further comprises selecting the small reference areas from patterns created from detected fixed information of the learning sheet.

36. The method of claim 9, wherein at least one of the small reference areas comprises a detected character string.

37. The computer readable storage medium of claim 17, wherein the selecting further comprises selecting the small reference areas from patterns created from detected fixed information of the learning sheet.

38. The computer readable storage medium of claim 17, wherein at least one of the small reference areas comprises a detected character string.

39. The computer implemented method of claim 25, wherein at least one of the small reference areas comprises a detected character string.

* * * * *